US009950605B2

(12) United States Patent
Suyama et al.

(10) Patent No.: US 9,950,605 B2
(45) Date of Patent: Apr. 24, 2018

(54) HYBRID DRIVING DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Daiki Suyama, Okazaki (JP); Katsuhiko Hattori, Nagoya (JP); Hikaru Sugiura, Okazaki (JP); Tatsuya Okishima, Kariya (JP); Yukihiko Ideshio, Nissin (JP)

(73) Assignees: AISIN AW CO., LTD., Anjo (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/326,271

(22) PCT Filed: Jul. 3, 2015

(86) PCT No.: PCT/JP2015/069221
§ 371 (c)(1),
(2) Date: Jan. 13, 2017

(87) PCT Pub. No.: WO2016/017369
PCT Pub. Date: Feb. 4, 2016

(65) Prior Publication Data

US 2017/0203643 A1 Jul. 20, 2017

(30) Foreign Application Priority Data

Jul. 29, 2014 (JP) ................................ 2014-154081
Jan. 20, 2015 (JP) ................................ 2015-008806

(51) Int. Cl.
*B60K 6/387* (2007.10)
*B60K 6/547* (2007.10)
(Continued)

(52) U.S. Cl.
CPC .............. *B60K 6/387* (2013.01); *B60K 6/405* (2013.01); *B60K 6/547* (2013.01); *B60K 6/36* (2013.01);
(Continued)

(58) Field of Classification Search
CPC ........ B60K 6/387; B60K 6/405; B60K 6/547; B60K 6/365; B60K 6/36; Y10S 903/91;
(Continued)

(56) References Cited

U.S. PATENT DOCUMENTS 6,354,974 B1 * 3/2002 Kozarekar .............. B60K 6/26 180/65.21
6,863,140 B2 * 3/2005 Noreikat ................ B60K 6/383 180/65.23
(Continued)

FOREIGN PATENT DOCUMENTS

JP 2002-095191 A 3/2002
JP 2002-188657 A 7/2002
(Continued)

OTHER PUBLICATIONS

Sep. 15, 2015 Search Report issued in International Patent Application No. PCT/JP2015/069221.

*Primary Examiner* — Jacob B Meyer
(74) *Attorney, Agent, or Firm* — Oliff PLC

(57) ABSTRACT

A hybrid driving device that includes a first input that is linked to an internal combustion engine; a rotary electric machine; a transmission that changes a speed of rotation of a second input, and transmits the rotation to an output; a rotor support which rotates integrally with a rotor of the rotary electric machine; a first engagement device; a second engagement device; and a case.

17 Claims, 5 Drawing Sheets

(51) Int. Cl.

| | |
|---|---|
| ***B60K 6/405*** | (2007.10) |
| *B60K 6/36* | (2007.10) |
| *B60K 6/365* | (2007.10) |
| *F16D 13/52* | (2006.01) |
| *F16D 13/72* | (2006.01) |
| *F16D 13/74* | (2006.01) |
| *F16H 45/02* | (2006.01) |
| *F16D 25/0638* | (2006.01) |

(52) U.S. Cl.

CPC ........... *B60K 6/365* (2013.01); *B60Y 2200/92* (2013.01); *B60Y 2400/406* (2013.01); *B60Y 2400/426* (2013.01); *B60Y 2400/4244* (2013.01); *F16D 13/52* (2013.01); *F16D 13/72* (2013.01); *F16D 13/74* (2013.01); *F16D 25/0638* (2013.01); *F16H 45/02* (2013.01); *Y10S 903/909* (2013.01); *Y10S 903/91* (2013.01); *Y10S 903/914* (2013.01); *Y10S 903/919* (2013.01); *Y10S 903/952* (2013.01)

(58) Field of Classification Search

CPC ............. Y10S 903/909; Y10S 903/952; Y10S 903/914; Y10S 903/919; F16D 25/0638; F16D 13/74; F16D 13/72; F16D 13/52; F16H 45/02; B60Y 2400/4244; B60Y 2200/92; B60Y 2400/426; B60Y 2400/406

See application file for complete search history.

(56) References Cited

U.S. PATENT DOCUMENTS 7,293,637 B2 * 11/2007 Janson ..................... B60K 6/48 180/65.25
7,339,300 B2 * 3/2008 Burgman ................. B60K 6/26 180/65.1
7,485,061 B2 * 2/2009 Reisch ................... B60K 6/387 475/5
7,832,537 B2 * 11/2010 Blessing ................ B60K 6/387 192/48.611
7,891,476 B2 * 2/2011 Iwasaki ................... F16D 21/06 192/85.25
8,376,108 B2 * 2/2013 Fujita .................. F16D 25/0638 192/113.35
8,448,541 B2 * 5/2013 Kasuya .................. B60K 6/387 180/65.245
8,534,436 B2 * 9/2013 Noehl ..................... F16D 21/06 192/48.606
8,622,182 B2 * 1/2014 Iwase ....................... B60K 6/26 180/65.26
8,714,287 B2 * 5/2014 Kim ......................... B60K 6/40 180/65.22
8,757,305 B2 * 6/2014 Roske ...................... B60K 6/38 180/65.22
8,863,926 B2 * 10/2014 Knowles ................ B60K 6/387 192/48.611
8,991,577 B2 * 3/2015 Hauck ..................... F16D 21/06 192/48.609
9,175,759 B2 * 11/2015 Iwase ...................... F16H 45/00
9,670,838 B2 * 6/2017 Iwase .................... F02B 63/042
9,670,967 B2 * 6/2017 Moser ...................... F16D 13/52
9,677,646 B2 * 6/2017 Kasuya ................... F16H 3/725
9,695,742 B2 * 7/2017 Iwase .................... F02B 63/042
2002/0066607 A1 * 6/2002 Levin ....................... B60K 6/22 180/65.25
2003/0148843 A1 * 8/2003 Bowen ..................... B60K 6/26 475/5
2004/0045784 A1 * 3/2004 Ebert ...................... F16D 25/14 192/48.601
2004/0099499 A1 * 5/2004 Orlamunder ............ F16D 21/06 192/48.8
2004/0206599 A1 * 10/2004 Hegerath ................ F16D 21/06 192/48.611
2006/0144665 A1 * 7/2006 Janson ..................... B60K 6/48 192/48.8
2006/0163019 A1 * 7/2006 Feldhaus ................. F16D 21/06 192/48.8
2007/0049445 A1 * 3/2007 Reisch ................... B60K 6/387 475/5
2007/0175723 A1 * 8/2007 Blessing ................ B60K 6/387 192/48.8
2007/0175726 A1 * 8/2007 Combes ................... B60K 6/40 192/48.614
2007/0213163 A1 * 9/2007 Combes ................... B60K 6/26 475/100
2007/0289833 A1 * 12/2007 Chapelon ............... B60K 6/387 192/48.1
2008/0015085 A1 * 1/2008 Chapelon ............... B60K 6/387 477/6
2008/0047799 A1 * 2/2008 Combes ................. B60K 6/387 192/58.5
2009/0008212 A1 * 1/2009 Combes ................. B60K 6/387 192/113.34
2009/0105040 A1 * 4/2009 Sanji ........................ B60K 6/40 477/5
2010/0109461 A1 * 5/2010 Kato ........................ B60K 6/26 310/90
2012/0242199 A1 * 9/2012 Iwase ....................... B60K 6/40 310/68 B
2013/0193816 A1 * 8/2013 Iwase ..................... H02K 7/003 310/75 R
2014/0113760 A1 * 4/2014 Diemer .................. B60K 6/365 475/149
2014/0230423 A1 * 8/2014 Iwase ....................... B60K 6/26 60/445
2015/0000262 A1 * 1/2015 Iwase ...................... F16H 45/00 60/330
2017/0203643 A1 * 7/2017 Suyama ................. B60K 6/387

FOREIGN PATENT DOCUMENTS

JP 2003-021170 A 1/2003
JP 2004-306827 A 11/2004
JP 2007-062726 A 3/2007
JP 2008-501900 A 1/2008
JP 2013-096552 A 5/2013

* cited by examiner

HYBRID DRIVING DEVICE

BACKGROUND

The present disclosure relates to a hybrid driving device.

For example, in JP-A-2013-96552, a hybrid driving device including: a first input member which is linked to an internal combustion engine; a rotary electric machine; a transmission apparatus which changes a speed of rotation of a second input member, and transmits the rotation to an output member; a rotor supporting member which rotates integrally with a rotor of the rotary electric machine; a first engagement device; a second engagement device; and a case, is disclosed. In a technology described in JP-A-2013-96552, the first input member and the second input member are configured to be linked to or separated from each other in accordance with a state of engagement of the first engagement device, but the second input member and the rotor supporting member are linked to each other.

SUMMARY

However, in the technology of JP-A-2013-96552, in a case where the first engagement device is engaged, the first input member and the second input member are linked to each other, and a vehicle is driven by a driving force of the internal combustion engine without using a driving force of the rotary electric machine, the rotating electric machine rotates together with the rotation of the internal combustion engine. As the rotary electric machine is rotated, power loss or friction loss occurs, and there is a concern that fuel efficiency deteriorates. However, when a mechanism, such as the second engagement device which can release a linked state of the second input member which is rotated by the driving force of the internal combustion engine and the rotor supporting member, and can separate the second input member and the rotor supporting member from each other, is provided, the device becomes long in the shaft direction, and there is a concern that the device becomes large.

Here, a hybrid driving device which can prevent the device from becoming long in the shaft direction even when there is provided a mechanism which can prevent the rotary electric machine from rotating together with driving of the vehicle, in a case where the vehicle is driven by the driving force of the internal combustion engine without using the driving force of the rotary electric machine, is desirable.

Considering the description above, a hybrid driving device including: a first input that is linked to an internal combustion engine; a rotary electric machine; a transmission that changes a speed of rotation of a second input member, and transmits the rotation to an output; a rotor support that rotates integrally with a rotor of the rotary electric machine; a first engagement device; a second engagement device; and a case, is configured as follows as one exemplary aspect. The first engagement device links or separates the first input and the second input to and from each other in accordance with a state of engagement of the first engagement device regardless of a state of engagement of the second engagement device, the second engagement device links or separates the rotor support and the second input to and from each other in accordance with a state of engagement of the second engagement device regardless of a state of engagement of the first engagement device, the rotor support includes a supporting tubular portion having a tubular shape which supports an inner circumferential surface of the rotor of the rotary electric machine from a radially inner side, and the first engagement device and the second engagement device are disposed on a radially inner side than the supporting tubular portion, the case has a tubular case boss portion, the second input includes an input tubular portion having a tubular shape which is disposed on a radially outer side of the case boss portion, both of the first engagement device and the second engagement device are engagement devices which are operated by an hydraulic pressure, and which are respectively provided with an oil chamber, and the tubular input portion supports a first oil chamber forming member which is a member that forms the oil chamber of the first engagement device, and a second oil chamber forming member which is a member that forms the oil chamber of the second engagement device.

Here, in the specification, "rotary electric machine" is used as a concept including any of a motor (electric motor), a generator (electric generator), and a motor-generator which achieves functions of both of a motor and a generator as necessary. In addition, in the specification, "overlapping when viewed in the A direction" means that there is an overlapping part when viewed in the A direction.

According to the above-described configuration, by efficiently using a space in a radially inner side than the rotor and the supporting tubular portion, it is possible to dispose the first engagement device and the second engagement device, and to prevent the device from becoming long in the shaft direction. In addition, according to the above-described configuration, it is possible to support the input tubular portion having a tubular shape which configures the second input from the radially inner side by the tubular case boss portion. In addition, it is possible to support the first oil chamber forming member of the first engagement device and the second oil chamber forming member of the second engagement device, by a common input tubular portion. Accordingly, it is possible to dispose each portion of the first engagement device and the second engagement device by efficiently using the space on the radially inner side of the rotor and the supporting tubular portion, and from this viewpoint, it is possible to prevent the device from becoming long in the shaft direction. In addition, it is possible to simplify a supporting structure of the first oil chamber forming member and the second oil chamber forming member, and to contribute to reduction of the size of the device.

BRIEF DESCRIPTION OF THE DRAWINGS

Various exemplary aspects of the disclosure will be described with reference to the drawings, wherein.

DETAILED DESCRIPTION OF EMBODIMENTS

1. First Embodiment

Figure 1:
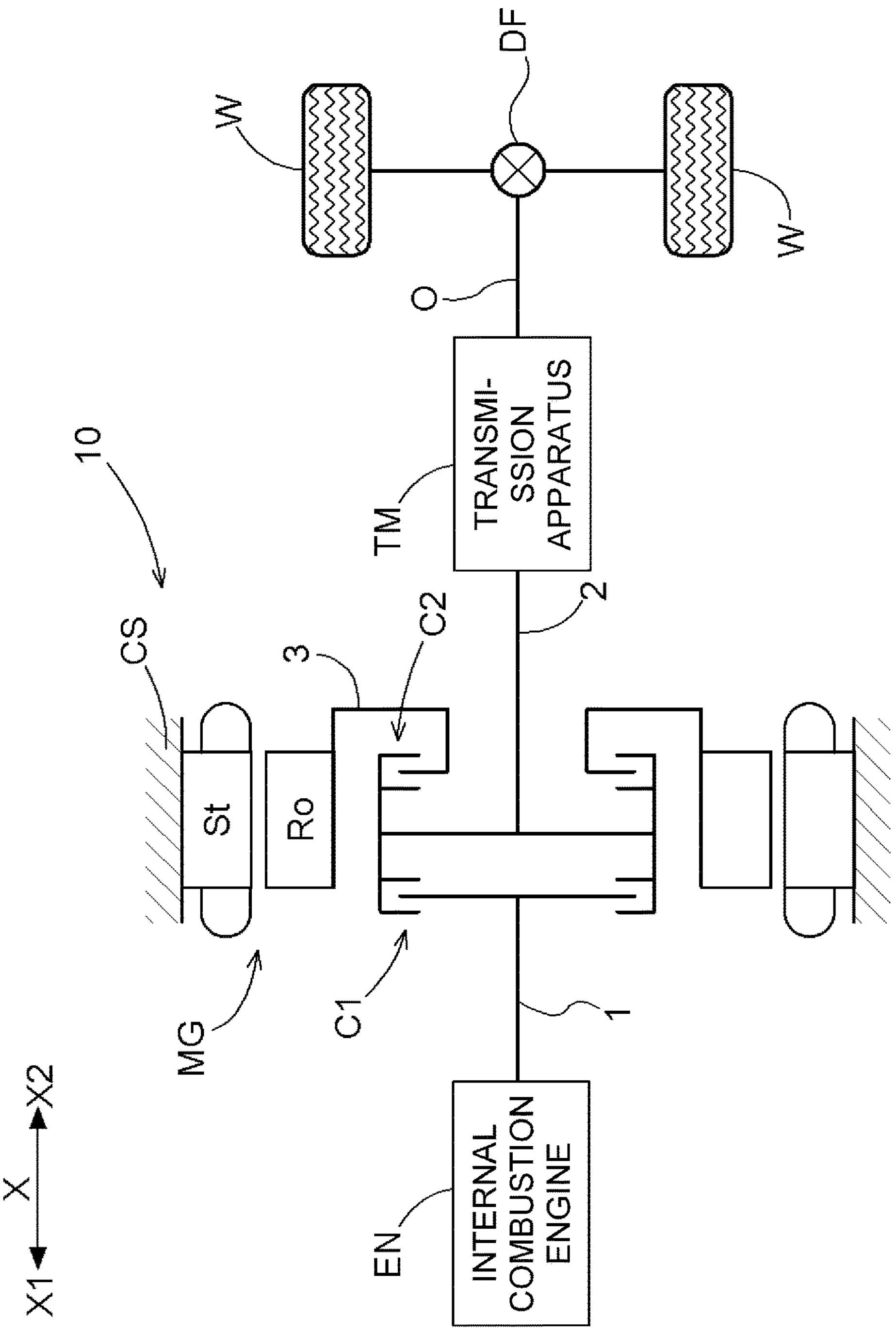
FIG. 1 is a schematic view illustrating a schematic configuration of a hybrid driving device according to a first embodiment.
Figure 2:
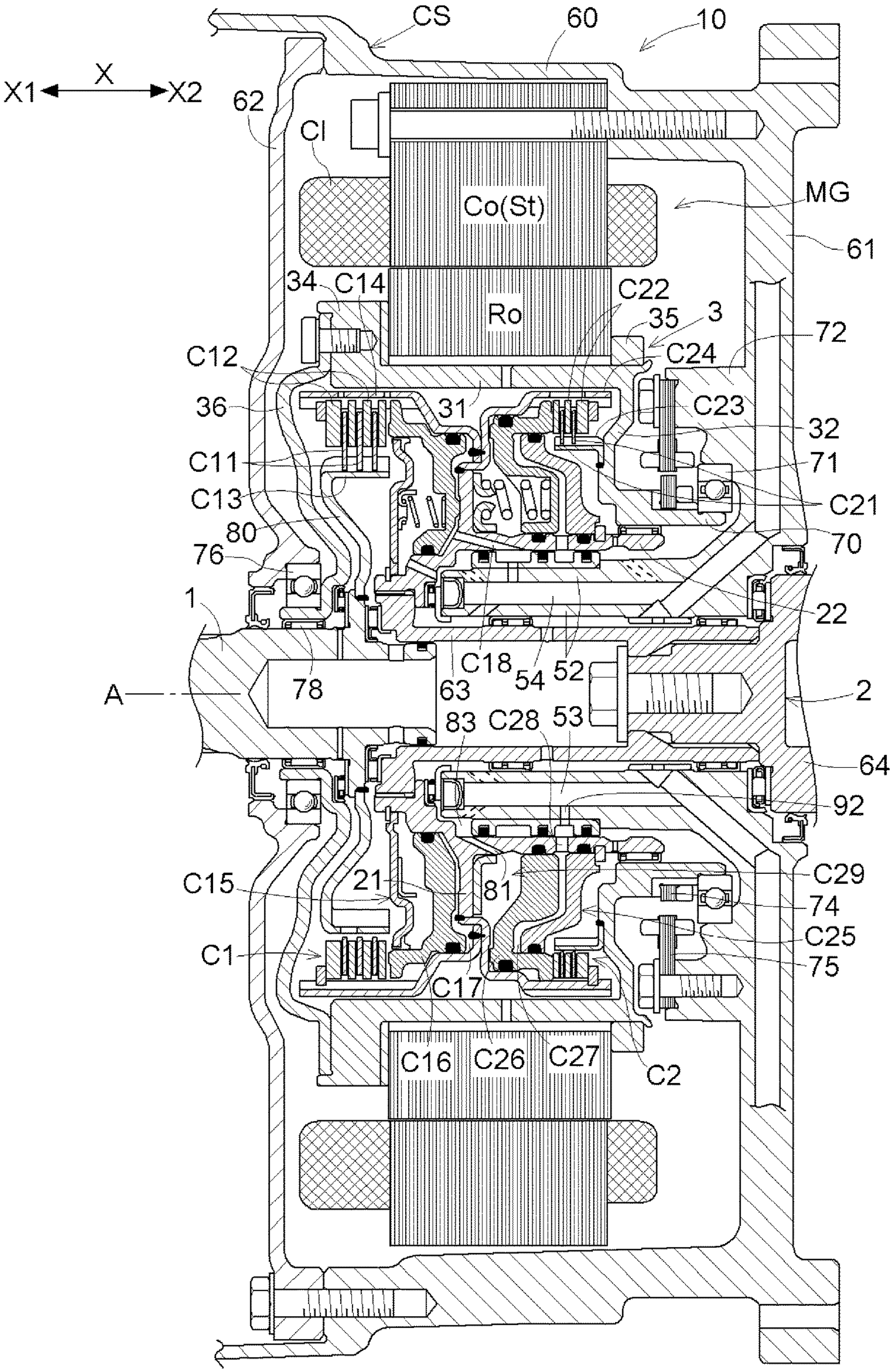
FIG. 2 is a cross sectional view in the shaft direction of main portions of the hybrid driving device according to the first embodiment.
Figure 3:
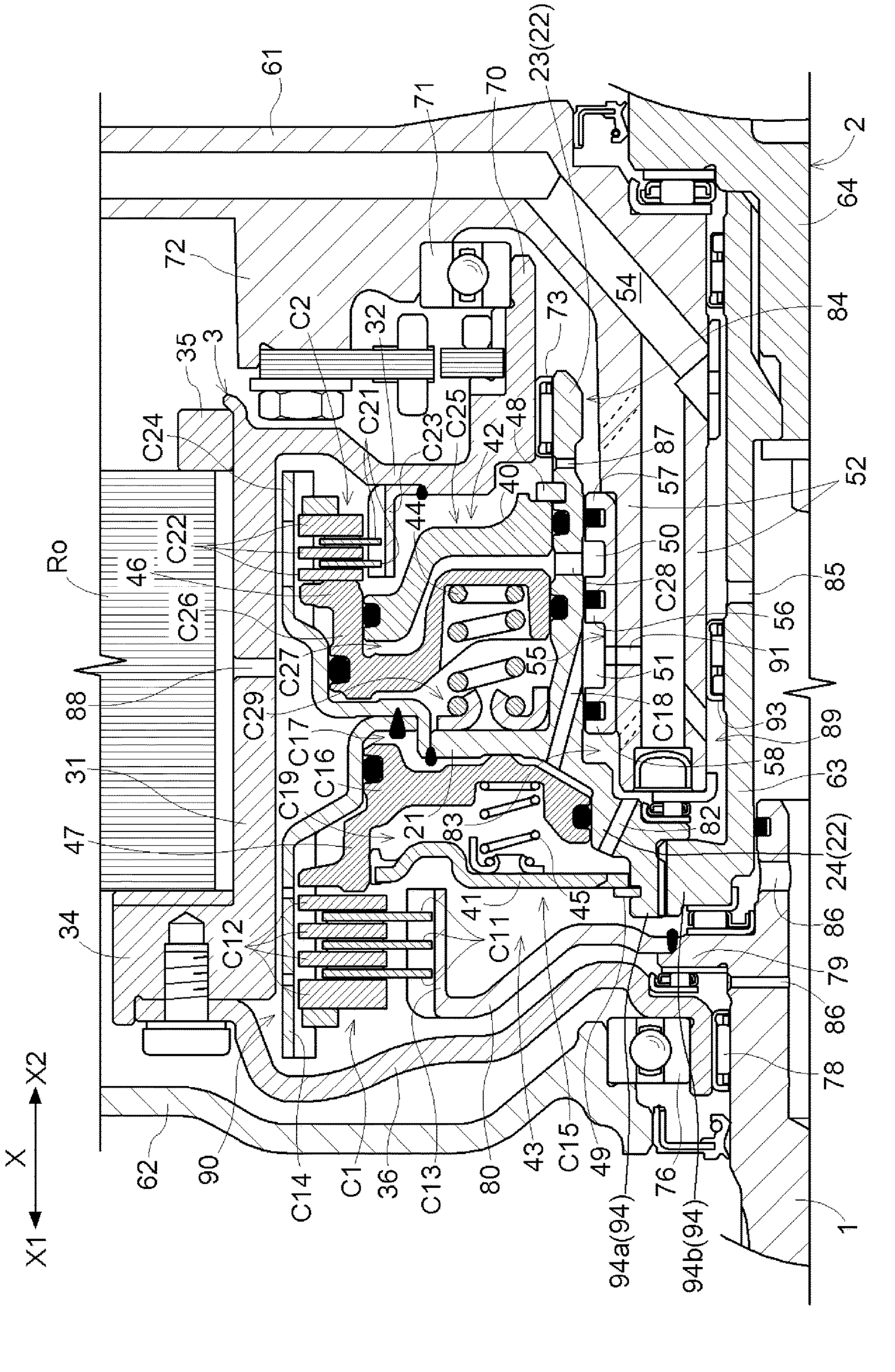
FIG. 3 is a cross sectional view in the shaft direction of the main portions of the hybrid driving device according to the first embodiment.

Hereinafter, a first embodiment of a hybrid driving device 10 will be described with reference to the drawings. FIG. 1 is a schematic view illustrating a schematic configuration of the hybrid driving device 10, FIG. 2 is a cross sectional view in the shaft direction in which main portions of the hybrid driving device 10 are cut by a plane including a shaft center A of a rotary electric machine MG, and FIG. 3 is a cross sectional view in the shaft direction which is further enlarged from FIG. 2. The hybrid driving device 10 includes: a first input member 1 (first input) which is linked to an internal combustion engine EN; the rotary electric machine MG; a transmission apparatus TM (transmission) which changes a speed of rotation of a second input member 2 (second input), and transmits the rotation to an output member O (output); a rotor supporting member 3 (rotor support) which rotates integrally with a rotor Ro of the rotary electric machine MG; a second engagement device C2; a first engagement device C1; and a case CS.

"A is disposed on a D side in the C direction of B" does not mean that A is disposed at a part on the D side in the C direction on the inside of B, but means that A is disposed on the outside of B, and is disposed on the D side in the C direction of B. In the embodiment, "A is disposed on a D side in the C direction of B" means that A is disposed on the D side in the C direction than B to overlap with B when viewed in the C direction. In addition, a case where A is disposed at a part on the D side in the C direction on the inside of B, is expressed as "A is disposed at a part (or end part or end surface) on the D side in the C direction of B".

In addition, the direction parallel to the shaft center A of the rotary electric machine MG is defined as a shaft direction X, one side in the shaft direction X is defined as a shaft first direction side X1, and the other side which is opposite to the shaft first direction side X1 and is in the shaft direction X is defined as a shaft second direction side X2. In addition, the radial direction and the circumferential direction are the radial direction and the circumferential direction regarding the shaft center A. In the embodiment, the first input member 1, the second input member 2, and the rotor supporting member 3 are disposed coaxially to the shaft center A of the rotary electric machine MG. Hereinafter, the hybrid driving device 10 according to the embodiment will be described in detail.

1-1. Entire Configuration of Hybrid Driving Device 10

The entire configuration of the hybrid driving device 10 according to the embodiment will be described. The hybrid driving device 10 is provided with the internal combustion engine EN and the rotary electric machine MG which are driving force sources of a vehicle.

<Internal Combustion Engine EN>

The internal combustion engine EN is a thermal engine which is driven by combustion of fuel, and for example, various known internal combustion engines such as a gasoline engine or a diesel engine, can be used. A crankshaft of the internal combustion engine EN is linked to the first input member 1 via a damper or the like, and the crankshaft of the internal combustion engine EN and the first input member 1 integrally rotate.

<Rotary Electric Machine MG>

The rotary electric machine MG includes: a stator St which is fixed to the case CS that is a non-rotary member; and the rotor Ro which is disposed on the radially inner side of the stator St, and is supported to be rotatable by the rotor supporting member 3. The stator St includes: a cylindrical stator core Co in which an electromagnetic steel plate having an annular plate shape is accumulated along the shaft direction X; and a coil C1 which is wound around the stator core Co. The rotor Ro is formed in a cylindrical shape in which the electromagnetic steel plate having an annular plate shape is accumulated along the shaft direction X. The rotor Ro rotates integrally with the rotor supporting member 3. The rotary electric machine MG can achieve a function as a motor (electric motor) which receives supply of power and generates power and a function as a generator (electric generator) which receives supply of power and generates power. Therefore, the rotary electric machine MG is electrically connected to a power storage device (not illustrated).

<Transmission Apparatus TM>

The transmission apparatus TM is a device which changes the speed of the rotation of a transmission shift input member 64, and transmits the rotation to the output member O. The second input member 2 is linked to the transmission shift input member 64 to integrally rotate. In the embodiment, the transmission apparatus TM is a stepped automatic transmission apparatus in which a plurality of transmission shift stages different in transmission shift ratio is changeably provided. In order to form the plurality of transmission shift stages, the transmission apparatus TM includes a gear mechanism, such as a planetary gear mechanism, and a plurality of engagement devices, such as a clutch or a brake. The transmission apparatus TM changes the rotational speed of the second input member 2 at a transmission shift ratio of each of the transmission shift stages and converts torque and transmits the torque to the output member O. The torque transmitted to the output member O from the transmission apparatus TM is distributed and transmitted to two left and right axles via a differential gear device DF, and is transmitted to a wheel W linked to each axle.

<First Engagement Device C1 and Second Engagement Device C2>

As illustrated in FIG. 1, the first engagement device C1 links or separates the first input member 1 and the second input member 2 to and from each other in accordance with a state of engagement of the first engagement device C1 regardless of a state of the engagement of the second engagement device C2. In other words, the first engagement device C1 directly links or separates the first input member 1 and the second input member 2 to and from each other without passing through another engagement device, such as the second engagement device C2. When the first input member 1 and the second input member are linked to each other by the engagement of the first engagement device C1, the first input member 1 and the second input member 2 are placed in a state of integrally rotating, and in a state where a driving force is transmitted between the first input member 1 and the second input member 2.

The second engagement device C2 links or separates the rotor supporting member 3 and the second input member 2 to and from each other in accordance with the state of the engagement of the second engagement device C2 regardless of the state of the engagement of the first engagement device C1. In other words, the second engagement device C2 directly links or separates the rotor supporting member 3 and the second input member 2 to and from each other without passing through another engagement device, such as the first engagement device C1. When the rotor supporting member 3 and the second input member 2 are linked to each other by the engagement of the second engagement device C2, the rotor supporting member 3 and the second input member 2 are placed in a state of integrally rotating, and in a state where a driving three is transmitted between the rotor supporting member 3 and the second input member 2.

As illustrated in FIGS. 2 and 3, the first engagement device C1 is configured to engage a primary engagement member C11 which rotates integrally with the first input member 1, and a secondary engagement member C12 which rotates integrally with the second input member 2, to each other. In other words, when the primary engagement member C11 and the secondary engagement member C12 are engaged with each other, the first engagement device C1 links the first input member 1 and the second input member 2 to each other, and when the engagement between the primary engagement member C11 and the secondary engagement member C12 is released, the first input member 1 and the second input member 2 are separated from each other.

The second engagement device C2 is configured to engage a primary engagement member C21 which rotates integrally with the rotor supporting member 3, and a secondary engagement member C22 which rotates integrally with the second input member 2, to each other. In other words, when the primary engagement member C21 and the secondary engagement member C22 are engaged with each other, the second engagement device C2 links the rotor supporting member 3 and the second input member 2 to each other, and when the engagement between the primary engagement member C21 and the secondary engagement member C22 is released, the rotor supporting member 3 and the second input member 2 are separated from each other.

In the embodiment, the first engagement device C1 and the second engagement device C2 are friction engagement devices, and each of the primary and secondary engagement members of the first engagement device C1 and the second engagement device C2 is a friction plate. Each of the first engagement device C1 and the second engagement device C2 is a wet type multiple disk clutch type friction engagement device. In addition, the first engagement device C1 includes an annular first piston C16, and a first hydraulic pressure actuator C15 which has a first hydraulic pressure chamber C17 that drives the first piston C16. The second engagement device C2 includes an annular second piston C26, and a second hydraulic pressure actuator C25 which has a second hydraulic pressure chamber C27 that drives the second piston C26. By driving the hydraulic pressure actuators C15 and C25, the primary and secondary engagement members are engaged to or released (disengagement) from each other. The first piston C16 and the second piston C26 are configured to move in the shaft direction X, and the first hydraulic pressure chamber C17 and the second hydraulic pressure chamber C27 are respectively provided on the shaft first direction side X1 or on the shaft second direction side X2 of the first piston C16 or the second piston C26, and are configured so that a force which pushes the first piston C16 or the second piston C26 to the shaft first direction side X1 or the shaft second direction side X2 by an hydraulic pressure supplied to the first hydraulic pressure chamber C17 or the second hydraulic pressure chamber C27.

The first engagement device C1 includes a tubular first hub portion C13 which supports the primary engagement member C11 of the first engagement device C1 from the radially inner side, and a tubular first drum portion C14 which supports the secondary engagement member C12 of the first engagement device C1 from the radially outer side. The first hub portion C13 is configured to be integrated with the first input member 1, and rotates integrally with the first input member 1. The first drum portion C14 is configured to be integrated with the second input member 2, and rotates integrally with the second input member 2.

The second engagement device C2 includes a tubular second hub portion C23 which supports the primary engagement member C21 from the radially inner side, and a second drum portion C24 which supports the secondary engagement member C22 from the radially outer side. The second hub portion C23 is configured to be integrated with the rotor supporting member 3, and rotates integrally with the rotor supporting member 3. The second drum portion C24 is configured to be integrated with the second input member 2, and rotates integrally with the second input member 2.

1-2. Disposition Configuration of First Engagement Device C1 and Second Engagement Device C2

The rotor supporting member 3 includes a supporting tubular portion 31 having a tubular shape which supports an inner circumferential surface of the rotor Ro of the rotary electric machine MG from the radially inner side. The first engagement device C1 and the second engagement device C2 are disposed on the radially inner side than the supporting tubular portion 31. According to the configuration, by efficiently using a space on the radially inner side than the rotor Ro and the supporting tubular portion 31, it is possible to dispose the first engagement device C1 and the second engagement device C2, and to prevent the device from becoming long in the shaft direction X. In the embodiment, in order to support the rotor Ro from both sides in the shaft direction X, the length in the shaft direction X of the supporting tubular portion 31 becomes longer on both sides in the shaft direction X than the length in the shaft direction X of the rotor Ro. The inner circumferential surface of the supporting tubular portion 31 is formed in a cylindrical shape.

In addition, the rotor supporting member 3 has a radially supporting portion 32 (hereinafter, referred to as a second radially supporting portion 32) which supports the supporting tubular portion 31 from the radially inner side, and which extends in the radial direction. In the embodiment, the second radially supporting portion 32 extends to the radially inner side from the end part of the shaft second direction side X2 of the supporting tubular portion 31. The supporting tubular portion 31 includes a cylindrical shaft direction supporting portion 34 in which the shaft first direction side X1 of the rotor Ro extends to the radially outer side from an end part of the shaft first direction side X1 that extends to the shaft first direction side X1 than the rotor Ro. An end part of the shaft second direction side X2 of the supporting tubular portion 31 which extends further to the shaft second direction side X2 than the rotor Ro, supports a cylindrical supporting member 35 which supports the shaft second direction side X2 of the rotor Ro from the radially inner side and the shaft second direction side X2.

In addition, the second hub portion C23 of the second engagement device C2 is configured to be integrated with the rotor supporting member 3, and is disposed on the radially inner side than the supporting tubular portion 31. The second drum portion C24 of the second engagement device C2 is disposed between the supporting tubular portion 31 and the second hub portion C23 in the radial direction. The supporting tubular portion 31, the second drum portion 124, and the second hub portion C23 are disposed to overlap with each other when viewed in the radial direction. According to the configuration, between the supporting tubular portion 31 of the rotor supporting member 3, and the second hub portion C23 which is configured to be integrated with the rotor supporting member 3, the second drum portion C24 which rotates integrally with the second input member 2 side is disposed. Accordingly, in a space which is the radially inner side of the second drug portion C24 and the radially outer side of the second hub portion C23, the primary engagement member C21 and the secondary engagement member C22 are disposed. Accordingly it is possible to dispose each portion of the second engagement device C2 by efficiently using the space on the radially inner side of the rotor Ro in the radial direction, and to prevent the device from becoming long in thin shaft direction X. Since the second hub portion C23 is configured to be integrated with the rotor supporting member 3, an attaching structure of the second hub portion C23 can be simplified.

The second input member 2 includes a radially extending portion 21 which extends in the radial direction. The first drum portion C14 is formed to extend to the shaft first direction side X1 which is one side in the shaft direction X from the radially extending portion 21. The first hydraulic pressure actuator C15 of the first engagement device C1 is further toward the shaft first direction side X1 than the radially extending portion 21, is in the radially inner side than the first drum portion C14, and is disposed to overlap with the first drum portion C14 when viewed in the radial direction. The second drum portion C24 extends to the shaft second direction side X2 opposite to the shaft first direction side X1 from the radially extending portion 21. The second hydraulic pressure actuator C25 of the second engagement device C2 is disposed on the shaft second direction side X2 than the radially extending portion 21, and on the radially inner side than the second drum portion C24 to overlap with the second drum portion C24 when viewed in the radial direction.

According to the configuration, the first drum portion C14 and the second drum portion C24 can be formed extending to both sides in the shaft direction X from the common radially extending portion 21. Accordingly, it is possible to simplify the supporting structure of the first drum portion C14 and the second drum portion C24, and by efficiently using the space on both sides in the shaft direction X of the radially extending portion 21, it is possible to dispose the first drum portion C14 and the second drum portion C24. In addition, the first hydraulic pressure actuator C15 and the second hydraulic pressure actuator C25 are on the radially inner side of the first drum portion C14 and the second drum portion C24, and can be disposed by efficiently using the space on both sides in the shaft direction X of the radially extending portion 21. Accordingly, on both sides in the shaft direction X of the common radially extending portion 21, it is possible to efficiently dispose the first engagement device C1 and the second engagement device C2, and to prevent the device from becoming long in the shaft direction X.

In addition, an oil chamber of the first engagement device C1 is formed to be adjacent to the shaft first direction side X1 of the radially extending portion 21, and an oil chamber of the second engagement device C2 is formed to be adjacent to the shaft second direction side X2 of the radially extending portion 21. In the embodiment, the first hydraulic pressure chamber C17 of the first engagement device C1 is formed to be adjacent to the shaft first direction side X1 of the radially extending portion 21, and a surface on the shaft first direction side X1 of the radially extending portion 21 configures a surface on the shaft second direction side X2 of the first hydraulic pressure chamber C17. A second back pressure chamber C29 of the second engagement device C2 is formed to be adjacent to the shaft second direction side X2 of the radially extending portion 21, and a surface on the shaft second direction side X2 of the radially extending portion 21 configures a surface on the shaft first direction side X1 of the second back pressure chamber C29.

In the embodiment, the radially extending portion 21 is formed in an annular plate shape which extends to the radially outer side and in the circumferential direction, from a base part (in the example, input tubular portion 22) of the second input member 2. The first drum portion C14 is formed in a cylindrical shape which extends to the shaft first direction side X1 from the end part on the radially outer side of the radially extending portion 21, and the second drum portion C24 is formed in a cylindrical shape which extends to the shaft second direction side X2 from the end part on the radially outer side of the radially extending portion 21. More specifically, each of the first drum portion C14 and the second drum portion C24 has an annular plate portion which extends to the radially outer side and in the circumferential direction from the end part on the radially outer side of the radially extending portion 21, and has a cylindrical portion which extends to the shaft first direction side X1 or the shaft second direction side X2 from the end part on the radially outer side of each annular plate portion. The radially extending portion 21, the first drum portion C14, and the second drum portion C24, are bonded to each other by welding.

On the radially inner side of a part on the shaft first direction side X1 in the first drum portion C14, the primary engagement member C11 and the secondary engagement member C12 of the first engagement device C1 made of a plurality of friction plates having an annular plate shape are disposed in parallel alternately in the shaft direction X, and the cylindrical first hub portion C13 is disposed on the radially inner side of the primary engagement member C11 and the secondary engagement member C12. An outer circumferential surface of the friction plate of the secondary engagement member C12 is linked to the inner circumferential surface of a part on the shaft first direction side X1 in the first drum portion C14 by spline fitting, and an inner circumferential surface of the friction plate of the primary engagement member C11 is linked to the outer circumferential surface of the first hub portion C13 by spline fitting. On the radially inner side of a part on the shaft second direction side X2 in the first drum portion C14, the first hydraulic pressure actuator C15 is disposed. The inner circumferential surface of a part on the shaft second direction side X2 in the first drum portion C14 configures an outer sliding surface on which the outer circumferential surface of the first piston C16 of the first engagement device C1 slides. A diameter of a part, on the shaft second direction side X2 in the first drum portion C14 which configures the outer sliding surface, is smaller than a diameter of a part on the shaft first direction side X1 in the first drum portion C14 which configures a spline-fitting surface to which the secondary engagement member C12 is fitted.

On the radially inner side of a part on the shaft second direction side X2 in the second drum portion C24, the primary engagement member C21 and the secondary engagement member C22 of the second engagement device C2 made of the plurality of friction plates having an annular plate shape, are disposed in parallel alternately in the shaft direction X, and the cylindrical second huh portion C23 is disposed on the radially inner side of the primary engagement member C21 and the secondary engagement member C22. The outer circumferential surface of the friction plate of the secondary engagement member C22 is linked to the inner circumferential surface of a part on the shaft second direction side X2 in the second drum portion C24 by spline fitting, and the inner circumferential surface of the friction plate of the primary engagement member C21 is linked to the outer circumferential surface of the second hub portion C23 by spline fitting. On the radially inner side of a part on the shaft first direction side X1 in the second drum portion C24, the second hydraulic pressure actuator C25 is disposed. The inner circumferential surface of a part on the shaft first direction side X1 in the second drum portion C24 configures the outer sliding surface on which the outer circumferential surface of a second piston C26 of the second engagement device C2 slides. A diameter of a part on the shaft first direction side X1 in the second drum portion C24 which configures the outer sliding surface, is smaller than a diameter of a part on the shaft second direction side X2 in the second drum portion C24 that configures the spline-fitting surface to which the secondary engagement member C22 is fitted.

The radially extending portion 21 is disposed on the radially inner side of a center part of the supporting tubular portion 31 in the shaft direction X, the first drum portion C14 is disposed on the radially inner side of a part of the shaft first direction side X1 than the center part in the supporting tubular portion 31 having a void between the first drum portion C14 and the supporting tubular portion 31, and the second drum portion C24 is disposed on the radially inner side of a part of the shaft second direction side X2 than the center part in the supporting tubular portion 31 having a void between the second drum portion C24 and the supporting tubular portion 31. In addition, the radially extending portion 21, the first drum portion C14, and the second drum portion C24 are disposed to overlap with the rotor Ro when viewed in the radial direction. Both of the first hydraulic pressure actuator C15 and the second hydraulic pressure actuator C25 are disposed to overlap with the rotor Ro when viewed in the radial direction.

<Input Tubular Portion 22>

The second input member 2 includes the input tubular portion 22 having a tubular shape which extends in the shaft direction X on the radially inner side than the first piston C16 and the second piston C26. The outer circumferential surface of the input tubular portion 22 configures an inner sliding surface on which the inner circumferential surface of the first piston C16 and the inner circumferential surface of the second piston C26 slide. In addition, the outer circumferential surface of the input tubular portion 22 configures the inner surface of the first hydraulic pressure chamber C17 of the first piston C16, and the inner surface of the second hydraulic pressure chamber C27 of the second piston C26.

The input tubular portion 22 is disposed on the radially inner side of the first drum portion C14 and the second drum portion C24. The input tubular portion 22 is configured of a first input tubular portion 24 which is formed in a tubular shape that extends to the shaft first direction side X1 from the radially extending portion 21, and a second input tubular portion 23 which is formed in a tubular shape that extends to the shaft second direction side X2 from the radially extending portion 21. In the embodiment, the first input tubular portion 24 and the second input tubular portion 23 extend in the shall direction X from the end part on the radially inner side of the radially extending portion 21. The outer circumferential surface of the first input tubular portion 24 configures the inner sliding surface on which the inner circumferential surface of the first piston C16 slides, and the inner surface of the first hydraulic pressure chamber C17. The outer circumferential surface of the second input tubular portion 23 configures the inner sliding surface on which the inner circumferential surface of the second piston C26 slides, and the inner surface of the second hydraulic pressure chamber C27. The first input tubular portion 24 has a step-like outer circumferential surface whose diameter becomes smaller in a stepwise manner as approaching the shaft first direction side X1.

<First Hydraulic Pressure Actuator C15>

The first hydraulic pressure actuator C15 is disposed in a first accommodation space 43 which is a cylindrical space that is the radially inner side of the first drum portion C14 and the radially outer side of the first input tubular portion 24. The shaft first direction side X1 of the first hydraulic pressure actuator C15 is covered with a first actuator supporting member 41 having an annular plate shape which extends in the radial direction and in the circumferential direction. The first actuator supporting member 41 is disposed on the radially inner side of the center part of the first drum portion C14 in the shaft direction X having a void between the first actuator supporting member 41 and the first drum portion C14. The inner circumferential surface of the first actuator supporting member 41 is fitted to the outer circumferential surface of the first input tubular portion 24, and the first actuator supporting member 41 is positioned in the shaft direction X with respect to the first input tubular portion 24 by a first snap ring 49 fitted to the outer circumferential surface of the first input tubular portion 24. The radially outer side of the first accommodation space 43 is covered with the cylindrical first drum portion C14, the radially inner side of the first accommodation space 43 is covered with the cylindrical first input tubular portion 24, the shaft second direction side X2 of the first accommodation space 43 is covered with the radially extending portion 21 having an annular plate shape, and the shaft first direction side X1 of the first accommodation space 43 is covered with the first actuator supporting member 41 having an annular plate shape.

In the first accommodation space 43, the first piston C16, the first hydraulic pressure chamber C7, and a first elastic member 45 which biases the first piston C16 which configure the first hydraulic pressure actuator C15, are provided. In addition, the first piston C16 is provided with a tubular first friction plate pushing portion which passes through a void between the first drum portion C14 and the first actuator supporting member 41 from the end part on the radially outer side of a piston main body portion having an annular plate shape, and which extends to the shaft first direction side X1. The first friction plate pushing portion 47 pushes the plurality of friction plates of the first engagement device C1 disposed further toward the shaft first direction side X1 than the first actuator supporting member 41 and allows the fiction plates to be engaged with each other.

The first hydraulic pressure chamber C17 is disposed between the first piston C16 is the shaft direction X and the radially extending portion 21, that is, on the shaft second direction side X2 of the first piston C16, and is configured to push the first piston C16 to the shaft first direction side X1 which is an engagement side by the hydraulic pressure supplied to the first hydraulic pressure chamber C17. The first hydraulic pressure chamber C17 is an annular space which is surrounded by the surface on the shaft second direction side X2 of the first piston C16, the surface on the shaft first direction side X1 of the radially extending portion 21, the outer circumferential surface of the first input tubular portion and the inner circumferential surface of the first drum portion C14.

The first elastic member 45 is disposed between the first piston C16 in the shaft direction X and the first actuator supporting member 41, that is, on the shaft first direction side X1 of the first piston C16, and is configured to push the first piston C16 to the shaft second direction side X2 which is on a disengagement (release) side. In a state where the hydraulic pressure is not supplied to the first hydraulic pressure chamber C17, the first piston C16 is placed in a state where the friction plate is not pushed being moved to the shaft second direction side X2, and the first engagement device C1 is disengaged (released). When the hydraulic pressure supplied to the first hydraulic pressure chamber C17 increases, and exceeds the pushing force by the first elastic member 45 and a back pressure, the first piston C16 moves to the shaft first direction side X1, pushes the friction plate, and allows the first engagement device C1 to be engaged with the friction plate. On the sliding surfaces of the inner circumferential surface and the outer circumferential surface of the first piston C16, ring-shaped seal members are respectively provided.

In the embodiment, the first hydraulic pressure actuator C15 includes a first back pressure chamber C19 which stores the hydraulic pressure which becomes the back pressure of the first piston C16. Similar to the first elastic member 45, the first hack pressure chamber C19 is disposed on the shaft first direction side X1 of the first piston C16, and is configured to push the first piston C16 to the shaft second direction side X2 which is the disengagement side by the hydraulic pressure supplied to the first hack pressure chamber C19. The first back pressure chamber C19 is an annular space which is surrounded by the surface on the shaft first direction side X1 of the first piston C16, the surface on the shaft second direction side X2 of the first actuator supporting member 41, the outer circumferential surface of the first input tubular portion 24 and the inner circumferential surface of the first drum portion C14.

<Second Hydraulic Pressure Actuator 25>

A second hydraulic pressure actuator 25 is disposed in a second accommodation space 42 which is a cylindrical space that is the radially inner side of the second drum portion C24 and the radially outer side of the second input tubular portion 23. The shaft second direction side X2 of the second hydraulic pressure actuator C25 is covered with the second actuator supporting member 40 having an annular plate shape that extends in the radial direction and in the circumferential direction. The second actuator supporting member 40 is disposed on the radially inner side of the center part of the second drum portion C24 in the shaft direction X having a void between the second actuator supporting member 40 and the second drum portion C24. The inner circumferential surface of the second actuator supporting member 40 is fitted to the outer circumferential surface of the second input tubular portion 23, and the second actuator supporting member 40 is positioned in the shaft direction X with respect to the second input tubular portion 23 by a second snap ring 48 fitted to the outer circumferential surface of the second input tubular portion 23. The radially outer side of the second accommodation space 42 is covered with the cylindrical second drum portion C24, the radially inner side of the second accommodation space 42 is covered with the cylindrical second input tubular portion 23, the shaft first direction side X1 of the second accommodation space 42 is covered with the radially extending portion 21 having an annular plate shape, and the shaft second direction side X2 of the second accommodation space 42 is covered with the second actuator supporting member 40 having an annular plate shape.

In the second accommodation space 42, the second piston C26, the second hydraulic pressure chamber C27, and a second elastic member 44 which biases the second piston C26, which configure the second hydraulic pressure actuator C25, are provided. In addition, the second piston C26 is provided with a tubular second friction plate pushing portion 46 which passes through a void between the second drum portion C24 and the second actuator supporting member 40 from the end part on the radially outer side of a piston main body portion having an annular plate shape, and which extends to the shaft second direction side X2. The second friction plate pushing portion 46 pushes the plurality of friction plates of the second engagement device C2 disposed further toward the shaft second direction side X2 than the second actuator supporting member 40, and allows the fiction plates to be engaged with each other.

The second hydraulic pressure chamber C27 is disposed between the second piston C26 and the second actuator supporting member 40 in the shaft direction X, that is, on the shaft second direction side X2 of the second piston C26, and is configured to push the second piston C26 to the shaft first direction side X1 which is the disengagement (release) side by the hydraulic pressure supplied to the second hydraulic pressure chamber C27. The second hydraulic pressure chamber C27 is an annular space which is surrounded by the surface on the shaft second direction side X2 of the second piston C26 (main body portion), the surface on the shaft first direction side X1 of the second actuator supporting member 40, the outer circumferential surface of the second input tubular portion 23, and the inner circumferential surface of the second friction plate pushing portion 46 of the second piston C26.

The second elastic member 44 is disposed between the second piston C26 and the radially extending portion 21 in the shaft direction X, that is, on the shaft first direction side X1 of the second piston C26, and is configured to push the second piston C26 to the shaft second direction side X2 which is on an engagement side. In a state where the hydraulic pressure is not supplied to the second hydraulic pressure chamber C27, the second piston C26 moves to the shaft second direction side X2, pushes the friction plate, and allows the second engagement device C2 to be engaged with the friction plate. When the hydraulic pressure supplied to the second hydraulic pressure chamber C27 increases, and exceeds the pushing force by the second elastic member 44 and the back pressure, the second piston C26 is placed in a state where the friction plate is not pushed being moved to the first shaft direction side X1, and disengages (releases) the second engagement device C2. On the sliding surfaces of the inner circumferential surface and the outer circumferential surface of the second piston C26, ring-shaped seal members are respectively provided.

In the embodiment, the second hydraulic pressure actuator C25 includes a second back pressure chamber X29 which stores the hydraulic pressure which becomes the back pressure of the second piston X26. Similar to the second elastic member 44, the second back pressure chamber C29 is disposed on the shaft first direction side X1 of the second piston C26, and is configured to push the second piston C26 to the shaft second direction side X2 which is the engagement side by the hydraulic pressure supplied to the second back pressure chamber C29. The second back pressure chamber C29 is an annular space which is surrounded by the surface on the shaft first direction side X1 of the second piston C26, the surface on the shaft second direction side X2 of the radially extending portion 21, the outer circumferential surface of the second input tubular portion 21, and the inner circumferential surface of the second drum portion C24.

<Hydraulic Pressure Supply Oil Path>

The input tubular portion 22 is provided with a first supply oil path C18 which penetrates in the radial direction and supplies the hydraulic pressure to the first hydraulic pressure chamber C17, and a second supply oil path C28 which penetrates in the radial direction and supplies the hydraulic pressure to the second hydraulic pressure chamber C27. In the embodiment, the end part on the radially inner side of the first supply oil path C18 opens to the inner circumferential surface of the second input tubular portion 23, and the end part on the radially outer side of the first supply oil path C18 is open to a part which configures the inner surface of the first hydraulic pressure chamber C17 on the outer side surface in the radial direction of a linking portion between the first input tubular portion 24 and the radially extending portion 21. The end part on the radially inner side of the second supply oil path C28 is open to a part on the shaft second direction side X2 than the opening of the first supply oil path C18 on the inner circumferential surface of the second input tubular portion 23, the end part on the radially outer side of the second supply oil path C28 is open to the part which configures the inner surface of the second hydraulic pressure chamber C27 on the outer circumferential surface of the second input tubular portion 23.

<Inner Circumferential Oil Path>

On the radially inner side of the input tubular portion 22 (in the example, second input tubular portion 2), a case boss portion 52 having the tubular (in the example, cylindrical) outer circumferential surface is disposed, and between the inner circumferential surface of the input tubular portion 22 and the outer circumferential surface of the case boss portion 52, a first inner circumferential oil path 51 which supplies the hydraulic pressure to the first supply oil path C18, and a second inner circumferential oil path 50 which supplies the hydraulic pressure to the second supply oil path C28, are disposed. The first inner circumferential oil path 51 is an annular oil path which extends in the circumferential direction, and the hydraulic pressure is supplied from a first inner oil path 54 formed on the inside of the case boss portion 52. The second inner circumferential oil path 50 is an annular oil path which extends in the circumferential direction, and the hydraulic pressure is supplied from a second inner oil path 53 formed on the inside of the case boss portion 52. The first inner circumferential oil path 51 is disposed on the shaft first direction side X1 of the second inner circumferential oil path 50.

In the embodiment, between the inner circumferential surface of the input tubular portion 22 (in the example, second input tubular portion 23) and the outer circumferential surface of the case boss portion 52, the tubular connection oil path forming member 55 is disposed. The inner circumferential surface of the connection oil path forming member 55 is fitted and fixed to the outer circumferential surface of the case boss portion 52. The inner circumferential surface of the input tubular portion 22 is supported to be rotatable with respect to the outer circumferential surface of the case boss portion 52 via the connection oil path forming member 55. The first inner circumferential oil path 51 and the second inner circumferential oil path 50 are formed by the connection oil path forming member 55. At a part on the shaft, first direction side on the outer circumferential surface of the connection oil path forming member 55, a first groove which extends in the circumferential direction and is recessed to the radially inner side is formed, and a space which is surrounded by the first groove and the inner circumferential surface of the input tubular portion 22 (in the example, second input tubular portion 23), is the first inner circumferential oil path 51. At a part of the shaft second direction side X2 on the outer circumferential surface of the connection oil path forming member 55, a second groove which extends in the circumferential direction and is recessed to the radially inner side is formed, and a space which is surrounded by the second groove and the inner circumferential surface of the input tubular portion 22 (in the example, second input tubular portion 23), is the second inner circumferential oil path 50.

Between the first groove and the second groove in the shaft direction X, a intermediate tubular portion 56 having a tubular shape which protrudes to the radially outer side with respect to the first groove and the second groove, and is included in the connection oil path forming member 55, is disposed, and in the intermediate tubular portion 56, the tubular seal member which seals a part between the intermediate tubular portion 56 and the inner circumferential surface of the input tubular portion 22 is provided. The shaft second direction side X2 of the first inner circumferential oil path 51 and the shaft first direction side X1 of the second inner circumferential oil path 50 are sealed by the common intermediate tubular portion 56 and the seal member. As described above, since the first supply oil path C18 related to the first hydraulic pressure chamber C17, and the second supply oil path C28 related to the second hydraulic pressure chamber C27, are formed in the common input tubular portion 22, the first inner circumferential oil path 51 related to the first supply oil path C18, and the second inner circumferential oil path 50 related to the second supply oil path C28 are allowed to be adjacent to each other in the shaft direction X, it is possible to configure to perform sealing by a common seal mechanism, and it is possible to reduce the length of the seal mechanism in the shaft direction X.

In addition, on the shaft first direction side X1 of the first groove, a first tubular portion 58 which protrudes to the radially outer side with respect to the first groove, and is included in the connection oil path forming member 55, is disposed, and in the first tubular portion 58, the tubular seal member which seals a part between the first tubular portion 58 and the inner circumferential surface of the input tubular portion 22 is provided, and the shaft first direction side X1 of the first inner circumferential oil path 51 is sealed. On the shaft second direction side X2 of the second groove, a second tubular portion 57 which protrudes to the radially outer side with respect to the second groove, and is included in the connection oil path forming member 55, is disposed, and in the second tubular portion 57, the tubular seal member which seals a part between the second tubular portion 57 and the inner circumferential surface of the input tubular portion 22 is provided, and the shaft second direction side X2 of the second inner circumferential oil path 50 is sealed.

<Back Pressure Supply Oil Path>

The input tubular portion 22 is provided with a first back pressure supply oil path 82 which penetrates in the radial direction and supplies the hydraulic pressure to the first back pressure chamber C19, and a second back pressure supply oil path 81 which penetrates in the radial direction and supplies the hydraulic pressure to the second back pressure chamber C29 (refer to FIG. 2). In the embodiment, the end part on the radially inner side of the first back pressure supply oil path 82 and the end part on the radially inner side of the second back pressure supply oil path 81 are open to a part (hereinafter, referred to as a back pressure supply void 83) on the shaft first direction side X1 than the connection oil path forming member 55 at a void between the input tubular portion 22 and the case boss portion 52. The hydraulic pressure is supplied from an inner lubricating oil path (not illustrated) formed on the inside of the case boss portion 52 to the back pressure supply void 83. At the void between the input tubular portion 22 and the case boss portion 52, at a part (hereinafter, referred to as a second lubricating supply void 84) on the shaft second direction side X2 than the connection oil path forming member 55, the hydraulic pressure is also supplied from the inner lubricating oil path (not illustrated) of the case boss portion 52. In order to perform lubricating and cooling, the hydraulic pressure supplied to the second lubricating supply void 84 is supplied to the friction plates (C21, C22) of the second engagement device C2, bearings 71 and 73, or the rotary electric machine MG. At the void (hereinafter, referred to as a first lubricating supply void 89) between the case boss portion 52 and an inner tubular portion 63 which will be described later, the hydraulic pressure is supplied from the inner lubricating oil path (not illustrated) of the case boss portion 52. In order to perform lubricating and cooling, the hydraulic pressure supplied to the back pressure supply void 83 and the first lubricating supply void 89 is supplied to the friction plates (C11, C12) of the first engagement device C bearings 76 and 78, or the rotary electric machine MG.

<Case Boss Portion 52>

In the embodiment, the case boss portion 52 is a tubular (in the example, cylindrical shape) member, and configures a part of the case CS. The case CS includes a tubular circumferential wall 60 which covers an outer circumferential of the rotary electric machine MG. In addition, on the shaft second direction side X2 than the rotary electric machine MG, the case CS includes a second partition wall 61 having an annular plate shape which is on the radially inner side from the circumferential wall 60 and extends in the circumferential direction. The case CS includes a tubular case boss portion 52 which extends to the shaft first direction side X1 from the end part on the radially inner side of the second partition wall 61. In addition, the case CS includes a first partition wall 62 having an annular plate which is on the radially inner side from the circumferential wall 60 and extends in the circumferential direction, on the shaft first direction side X1 than the rotary electric machine MG. The first partition wall 62 is fixed to the circumferential wall 60 by a bolt.

The second input member 2 includes the input tubular portion 22 having a tubular shape (in the example, cylindrical shape) disposed on the radially outer side of the case boss portion 52. As described above, the first engagement device C1 and the second engagement device C2 are engagement devices which is operated by any hydraulic pressure, and any of the devices is provided with the oil chamber. The input tubular portion 22 supports a first oil chamber forming member which is a member that forms the oil chamber of the first engagement device C1, and a second oil chamber forming member which is a member that forms the oil chamber of the second engagement device C2.

The outer circumferential surface of the input tubular portion 22 abuts against at least a part of the first oil chamber forming member and at least a part of the second oil chamber forming member, and supports the first oil chamber forming member and the second oil chamber forming member from the radially inner side. In addition, the input tubular portion is linked to rotate integrally with the first oil chamber forming member and the second oil chamber forming member.

In the embodiment, the first oil chamber forming member which forms the first hydraulic pressure chamber C17 that is an oil chamber of the first engagement device C1, is the first piston C16, the radially extending portion 21, the first drum portion C14, and the input tubular portion 22 (first input tubular portion 24). The outer circumferential surface of the input tubular portion 22 abuts against the inner circumferential surface of the first piston C16 to be slidable, supports the first piston C16 from the radially inner side, and configures the inner circumferential surface of the first hydraulic pressure chamber C17. The radially extending portion 21 extends to the radially outer side from the input tubular portion 22, and the input tubular portion 22 supports the radially extending portion 21 from the radially inner side. In addition, the first drum portion C14 extends to the shaft first direction side X1 from the end part on the radially outer side of the radially extending portion 21, and the input tubular portion 22 supports the first drum portion C14 from the radially inner side via the radially extending portion 21.

In addition, the first oil chamber forming member which forms the first back pressure chamber C19 that is an oil chamber of the first engagement device C1, is the first piston C16, the first actuator supporting member 41, and the input tubular portion. 22 (first input tubular portion 24). The outer circumferential surface of the input tubular portion 22 supports the inner circumferential surface of the first piston C16 to be slidable from the radially inner side, and configures the inner circumferential surface of the first back pressure chamber C19.

The outer circumferential surface of the input tubular portion 22 supports the inner circumferential surface of the first actuator supporting member 41 from the radially inner side.

The second oil chamber forming member which forms the second hydraulic pressure chamber C27 that is an oil chamber of the second engagement device C2, is the second piston C26, the second actuator supporting member 40, and the input tubular portion 22 (second input tubular portion 23). The outer circumferential surface of the input tubular portion 22 abuts against the inner circumferential surface of the second piston C26 to be slidable, supports the second piston C26 from the radially inner side, and configures the inner circumferential surface of the second hydraulic pressure chamber C27. The outer circumferential surface of the input tubular portion 22 supports the inner circumferential surface of the second actuator supporting member 40 from the radially inner side.

In addition, the second oil chamber forming member which forms the second back pressure chamber C29 that is an oil chamber of the second engagement device C2, is the second piston C26, the radially extending portion 21, the second drum portion C24, and the input tubular portion 22 (second input tubular portion 23). The outer circumferential surface of the input tubular portion 22 supports the inner circumferential surface of the second piston C26 to be slidable from the radially inner side, and configures the inner circumferential surface of the second back pressure chamber C29. The input tubular portion 22 supports the radially extending portion 21 from the radially inner side. In addition, the second drum portion C24 extends to the shaft second direction side X2 from the end part on the radially outer side of the radially extending portion 21, and the input tubular portion 22 supports the second drum portion C24 from the radially inner side via the radially extending portion 21.

<Inner Tubular Portion 63>

The second input member 2 is disposed on the radially inner side of the case boss portion 52, and includes the inner tubular portion 63 having a tubular shape (in the example, cylindrical shape) supported to be rotatable with respect to the inner circumferential surface of the case boss portion 52. The input tubular portion 22 and the inner tubular portion 63 are linked to each other in the radial direction to rotate integrally with each other by a radially linking portion 94 provided at a position which does not overlap with the case boss portion 52 when viewed in the radial direction. In the embodiment, the input tubular portion 22 and the inner tubular portion 63 are linked to each other by the cylindrical radially linking portion 94 on the shaft first direction side X1 of the case boss portion 52. The end part on the shaft first direction side X1 of the input tubular portion 22 extends to the radially inner side, and a part 94*a* on the radially outer side of the radially linking portion 94 is formed. The end part on the shaft first direction side X1 of the inner tubular portion 63 extends to the radially outer side, and a part 94*b* on the radially inner side of the radially linking portion 94 is formed. The inner circumferential surface of the part 94*a* of the radially link portion on the input tubular portion 22 side, and the outer circumferential surface of the part 94*b* of the radially linking portion on the inner tubular portion 63 side, are linked to each other to rotate integrally with each other in the circumferential direction by spline fitting.

The second input member 2 includes the inner tubular portion 63 which extends in the shaft direction X on the radially inner side of the tubular case boss portion 52, and which has the tubular outer circumferential surface. The outer circumferential surface of the inner tubular portion 63 is supported to be rotatable with respect to the inner circumferential surface of the case boss portion 52 via the bearing 93. The end part on the shaft second direction side X2 of the inner tubular portion 63 is linked to a transmission shift input member 64 of the transmission apparatus TM to rotate integrally with the transmission shift input member 64 by spline fitting and bolt fastening. The input tubular portion 22 is linked to rotate integrally with the inner tubular portion 63. In the embodiment, the inner tubular portion 63 and the input tubular portion 22 extend to the shaft first direction side X1 side than the case boss portion 52. At the end part on the shaft first direction side X1 of the inner tubular portion 63, a cylindrical flange portion in which the shaft first direction side X1 side of the case boss portion 52 extends to the radially outer side to the input tubular portion 22, is provided, and the end part (flange portion) on the shaft first direction side X1 of the inner tubular portion 63 and the end part on the shaft first direction side X1 of the input tubular portion 22 (first input tubular portion 24) are linked to each other to rotate integrally with each other. In the example, the outer circumferential surface of the end part (flange portion) on the shaft first direction side X1 of the inner tubular portion 63, and the inner circumferential surface on the shaft first direction side X1 of the input tubular portion 22, are spline-fitted to each other. The inner tubular portion 63 and the input tubular portion 22 which are surrounded by the outer circumferential surface of the inner tubular portion 63 and the inner circumferential surface of the input tubular portion 22 in which the case boss portion 52 of the cylindrical case CS is inserted into a cylindrical space which is open to the shaft second direction side X2, and which configures the second input member 2, are supported to be rotatable with respect to the case boss portion 52.

<Rotor Supporting Member 3>

The rotor supporting member 3 includes a shaft supporting portion 70 which is disposed on the radially inner side than the supporting tubular portion 31, and is supported to be rotatable by the bearing 71, and the second radially supporting portion 32 which extends in the radial direction to link the shaft supporting portion 70 and the supporting tubular portion 31 to each other. The second huh portion C23 is formed to protrude in the shaft direction X from a location in the middle of the radial direction in the second radially supporting portion 32, and is configured integrally with the second radially supporting portion 32.

In the embodiment, the second radially supporting portion 32 is formed in an annular plate shape in which the shaft second direction side X2 of the second engagement device C2 extends to the radially inner side from the end part on the shaft second direction side X2 of the supporting tubular portion 31. The second hub portion C23 is formed in a cylindrical shape which protrudes to the shaft first direction side X1 from the location in the middle of the radial direction in the second radially supporting portion 32. In the example, the second hub portion C23 is fitted to the second radially supporting portion 32 by the welding, and is configured integrally with the second radially supporting portion 32. The second radially supporting portion 32 extends to the radially inner side to the position on the radially outer side than the second input tubular portion 23. The shaft supporting portion 70 is formed in a cylindrical shape which extends to the shaft second direction side X2 from the end part on the radially inner side of the second radially supporting portion 32. The outer circumferential surface of the shaft supporting portion 70 is supported to be rotatable with respect to the inner circumferential surface of a cylindrical boss portion 72 which protrudes to the shaft first direction side X1 from the second partition wall 61 of the case CS via the bearing 71. A rotor 74 of a resolver which is a rotational speed sensor of the rotary electric machine MG is fixed to the other circumferential surface of the shaft supporting portion 70, a stator 75 of the resolver is fixed to the end part on the shaft first direction side X1 of the boss portion 72, and the resolver is disposed between the second radially supporting portion 32 and the second partition wall 61 in the shaft direction X.

In the input tubular portion 22, a part on the opposite side (in the example, shaft second direction side X2) of the connection oil path forming member 55 from a side on which the radially linking portion 94 is disposed, is supported to be rotatable with respect to the case CS via the rotor supporting member 3. In the embodiment, the second input tubular portion 23 of the second input member 2 extends to the shaft second direction side X2 to a position at which the second radially supporting portion 32 and the shaft supporting portion 70 of the rotor supporting member 3 overlap with each other when viewed in the radial direction, and the outer circumferential surface of the end part on the shaft second direction side X2 of the second input tubular portion 23 is supported to be rotatable with respect to the inner circumferential surface of the shaft supporting portion 70 via the bearing 73.

In addition, the rotor supporting member 3 includes a first radially supporting portion 36 which is disposed at a position in the shaft direction X different from the second radially supporting portion 32, supports the supporting tubular portion 31 from the radially inner side and extends in the radial direction. The first radially supporting portion 36 is formed in an annular plate shape in which the shaft first direction side X1 of the first engagement device C1 extends to the radially inner side from the end part on the shaft first direction side X1 of the supporting tubular portion 31. The first radially supporting portion 36 is fixed to the end part on the shaft first direction side X1 of the supporting tubular portion 31 by the bolt. The first radially supporting portion 36 is supported to be rotatable with respect to the end part on the radially inner side of the first partition wall 62 of the case CS via the bearing 76.

The first engagement device C1 and the second engagement device C2 are disposed on the radially inner side than the supporting tubular portion 31, and are disposed between the first radially supporting portion 36 and the second radially supporting portion 32 in the shall direction X. According to this, it is possible to accommodate the first engagement device C1 and the second engagement device C2 which are further inwards in the radial direction than the supporting tubular portion 31, and at a space between the first radially supporting portion 36 and the second radially supporting portion 32 which support the supporting tubular portion 31 from the radially inner side, in the shaft direction X.

The first input member 1 linked to the internal combustion engine EN is a shaft body which is disposed on the shaft first direction side X1 of the second input member 2 except parts which partially overlap with each other when viewed in the radial direction, and which has the cylindrical outer circumferential surface that extends to the first shaft direction side X1. The outer circumferential surface of the first input member 1 is supported to be rotatable with respect to the end part on the radially inner side of the first radially supporting portion 36, via the bearing 78. The first input member 1 includes a cylindrical flange portion 79 which extends to the radially outer side between the first radially supporting portion 36 and the second input members 2 in the shaft direction X. The first hub portion C13 includes a hub supporting portion 80 having an annular plate shape which extends to the radially inner side from the end part on the shaft first direction side X1 side of a cylindrical part which supports the friction plate. The end part on the radially inner side of the hub supporting portion 80 is linked to the end part on the radially outer side of the flange portion 79 to rotate integrally with the end part. In the example, the first hub portion C13 is bonded to the first input member 1 by welding, and is configured to integrally with the first input member 1.

<Hydraulic Pressure Supply Path>

In the input tubular portion 22 and the case boss portion 52, an oil path which supplies the oil to the oil chamber of the first engagement device C1, and an oil path which supplies the oil to the oil chamber of the second engagement device C2, are formed. As described above, in the input tubular portion 22, the first supply oil path C18 which supplies the oil to the first hydraulic pressure chamber C17 of the first engagement device C1, and the first back pressure supply oil path 82 which supplies the oil to the first back pressure chamber C19 of the first engagement device C1, are formed. In addition, in the input tubular portion 22, the second supply oil path C28 which supplies the oil to the second hydraulic pressure chamber C27 of the second engagement device C2, and the second back pressure supply oil path 81 which supplies the oil to the second back pressure chamber C29 of the second engagement device C2, are formed. In the case boss portion 52, the first inner oil path 54 which supplies the oil to the first hydraulic pressure chamber C17 of the first engagement device C1, and the inner lubricating oil path (not illustrated) which supplies the oil to the first back pressure chamber C19 of the first engagement device C1, are formed. In addition, in the case boss portion 52, the second inner oil path 53 which supplies the oil to the second hydraulic pressure chamber C27 of the second engagement device C2, and the inner lubricating oil path (not illustrated) which supplies the oil to the second back pressure chamber C29 of the second engagement device C2, are formed.

Between the case boss portion 52 and the input tubular portion as described above, the tubular (in the example, cylindrical shape) connection oil path forming member 55 which forms the oil path that connects the oil path formed in the case boss portion 52 and the oil path formed in the input tubular portion 22 to each other. In the connection oil path forming member 55, as will be described later, a penetrating oil path 91 and the first inner circumferential oil path 51 which connect the first supply oil path C18 of the input tubular portion 22 and the first inner oil path 54 of the case boss portion 52 to each other, are formed. In the connection oil path forming member 55, as will be described later, a penetrating oil path 92 and the second inner circumferential oil path 50 which connect the second supply oil path C28 of the input tubular portion 22 and the second inner oil path 53 of the case boss portion 52 to each other, are formed. In addition, a part between the first back pressure supply oil path 82 of the input tubular portion 22 and the inner lubricating oil path of the case boss portion 52, and a part between the second back pressure supply oil path 81 of the input tubular portion 22 and the inner lubricating oil path of the case boss portion 52, are connected to each other by a void (in the example, back pressure supply void 83) between the case boss portion 52 and the input tubular portion 22.

The second partition wall 61 and the case boss portion 52 of the case CS are provided with a plurality of oil paths for supplying the hydraulic pressure supplied from an hydraulic pressure control device (not illustrated) to each portion, such as the friction plate, each bearing, and the rotary electric machine MG, in the hybrid driving device 10, such as the first hydraulic pressure chamber C17, the second hydraulic pressure chamber C27, the first back pressure chamber C19, the second back pressure chamber C29, the first engagement device C1, and the second engagement device C2. The hydraulic pressure control device is a device which controls the hydraulic pressure supplied to each portion of the hybrid driving device 10. The hydraulic pressure control device is provided with a plurality of hydraulic pressure control valves, such as a linear solenoid valve, adjusts the oil which is suctioned from an oil pan by an hydraulic pressure pump and of which the pressure is raised, to hydraulic pressures of each required level, and outputs the oil.

On the inside of the second partition wall 61, the oil paths which extend to the radially inner side from the hydraulic pressure control device, are formed at a plurality of locations in the circumferential direction, and on the inside of the case boss portion 52, and the oil paths which extend to the shaft first direction side from the oil path of the second partition wall 61, are formed at a plurality of locations in the circumferential direction. Each of the plurality of oil paths which are formed in the case boss portion 52 is the inner lubricating oil path which supplies the hydraulic pressure to the friction plate, the bearing, and the rotary electric machine MG, of the first inner oil path 54 which supplies the hydraulic pressure to the first hydraulic pressure chamber C17, the second inner oil path 53 which supplies the hydraulic pressure to the second hydraulic pressure chamber C27, the first back pressure chamber C19, the second back pressure chamber C29, the first engagement device C1, and the second engagement device C2. In FIG. 2, the first inner oil path 54 and the second inner oil path 53 are illustrated, and in FIG. 3, the first inner oil path 54 is illustrated. The first inner oil path 54 extends to the radially outer side from the oil path that extends in the shaft direction X, is open to the outer circumferential surface of the case boss portion 52, and communicates with the first inner circumferential oil path 51 via the penetrating oil path 91 which penetrates the connection oil path forming member 55 in the radial direction. The second inner oil path 53 extends to the radially outer side from the oil path that extends in the shaft direction X, is open to the outer circumferential surface of the case boss portion 52, and penetrates to the second inner circumferential oil path 50 via the penetrating oil path 92 which penetrates the connection oil path forming member 55 in the radial direction.

As illustrated by a broken line in FIGS. 2 and 3, the inner lubricating oil path extends to the radially outer side or to the radially inner side at a plurality of locations from the oil path (not illustrated) that extends in the shaft direction X, is open to the inner circumferential surface or the outer circumferential surface of the case boss portion 52, and supplies the hydraulic pressure to each portion, such as the back pressure supply void 83, the first lubricating supply void 89, or the second lubricating supply void 84. The hydraulic pressure supplied to the back pressure supply void 83 and the first lubricating supply void 89 from the inner lubricating oil path passes through a through hole 85 which penetrates the cylindrical inner tubular portion 63 in the radial direction, and is supplied to the space on the radially inner side of the tubular inner portion 63 and the space on the radially inner side of the first input member 1 which are connected to each other in the shaft direction X. In addition, the hydraulic pressure is supplied to the friction plates (C11, C12) of the first engagement device C1, the bearings 76 and 78, or the rotary electric machine MG through a through hole 86 that penetrates the tubular portion of the first input member 1 in the radial direction. The hydraulic pressure supplied to the second lubricating supply void 84 from the inner lubricating oil path passes through a through hole 87 or the like which penetrates the second input tubular portion 23 in the radial direction, and is supplied to the friction plates C21 and C22 of the second engagement device C2, the bearings 71 and 73, or the rotary electric machine MG.

The oil supplied to the friction plate of the first engagement device C1 and the second engagement device C2 is guided to a through hole 88 which penetrates the supporting tubular portion 31 in the radial direction, is guided to the oil path provided between the supporting tubular portion 31 and the rotor Ro, and cools the rotor Ro. After this, the oil is supplied to the stator St (the stator core Co and the coil C1), and after the stator St is cooled, the oil returns to the oil pan.

The first engagement device C1 and the second engagement device C2 are accommodated in a cylindrical space (hereinafter, referred to as an engagement device accommodation space 90) in which the radially outer side is covered with the supporting, tubular portion 31 of the cylindrical rotor supporting member 3, the shaft first direction side X1 is covered with the first radially supporting portion 36 of the rotor supporting member 3, and the shaft second direction side X2 is covered with the second radially supporting portion 32 of the rotor supporting member 3 having an annular plate shape. Accordingly, the oil supplied to the friction plate or the like of the first engagement device C1 and the second engagement device C2 remains in the cylindrical engagement device accommodation space 90, and due to a centrifugal force, the oil is guided to the through hole 88 of the supporting tubular portion 31 provided on the radially outer side of the engagement device accommodation space 90. Accordingly, the oil supplied to the friction plate or the like of the first engagement device C1 and the second engagement device C2 can be supplied to the rotary electric machine MG without leakage, and can efficiently cool the rotary electric machine MG.

2. Second Embodiment

Figure 4:
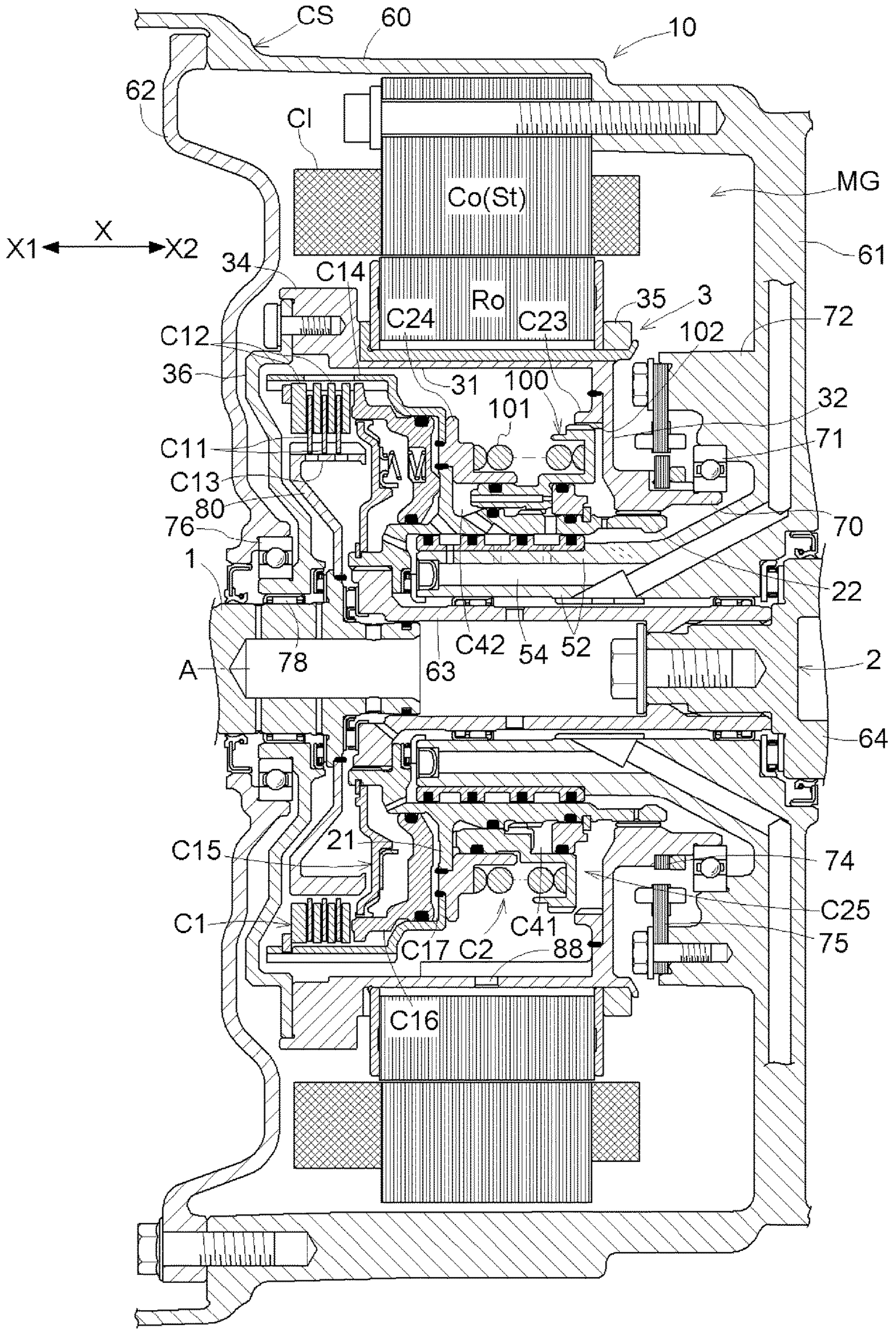
FIG. 4 is a cross sectional view in the shaft direction of main portions of a hybrid driving device according to a second embodiment.
Figure 5:
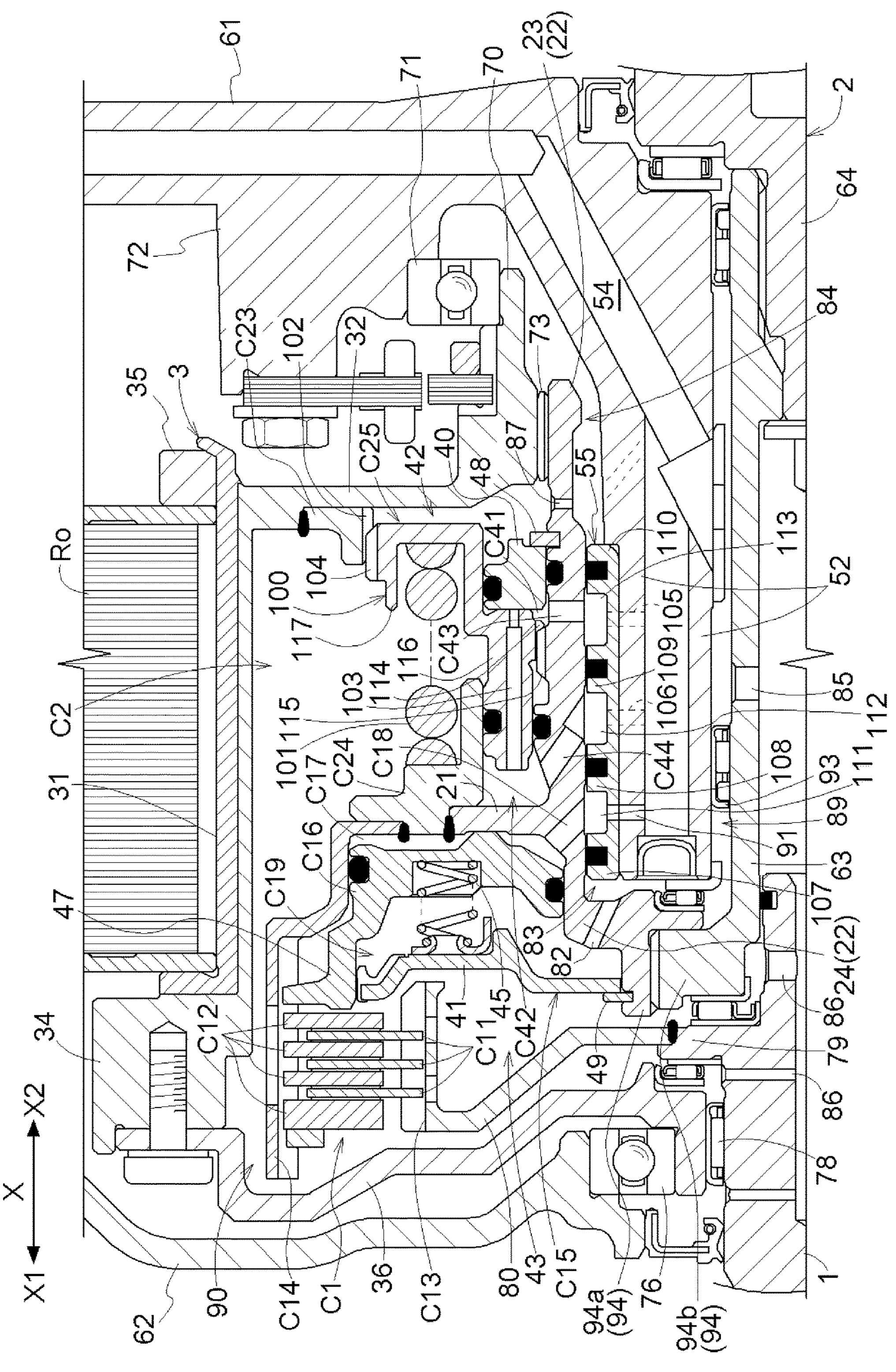
FIG. 5 is a cross sectional view in the shaft direction of the main portions of the hybrid driving device according to the second embodiment.

Hereinafter, a second embodiment of the hybrid driving device 10 will be described with reference to the drawings, FIG. 4 is a cross sectional view in the shaft direction cut by a plane including the shaft center A of the rotary electric machine MG illustrating main portions of the hybrid driving device 10 according to the embodiment, and FIG. 5 is a cross sectional view in the shaft direction in which FIG. 4 is further enlarged. In addition, an upper side of FIG. 4 illustrates a state where a sleeve member 100 of the second engagement device C2 slides to the shaft second direction side X2 and is engaged with the second engagement device C2, and a lower side of FIG. 4 illustrates a state where the sleeve member 100 of the second engagement device C2 slides to the shaft first direction side X1 and is released from the second engagement device C2. In the embodiment, the first engagement device C1 is the friction engagement device similar to that of the first embodiment, but the second engagement device C2 changes to meshing type engagement device. Since a configuration is similar to that of the first embodiment except for a part related to the meshing type second engagement device C2, the description thereof will be omitted.

The second engagement device C2 slides in the shall direction X along the outer circumferential surface of the input tubular portion 22, and is provided with the tubular sleeve member 100 which rotates integrally with the outer circumferential surface of the input tubular portion 22 in the circumferential direction; a first meshing portion 104 which is fixed to the sleeve member 100; a second meshing portion 102 which is fixed to the rotor supporting member 3, and meshes with the first meshing portion 104; and a first oil chamber C42 and a second oil chamber C41 which are respectively provided on both sides in the shaft direction X with respect to the sleeve member 100.

In the embodiment, the sleeve member 100 is provided with a cylindrical main body portion 116; and an extending portion 117 which extends to the radially outer side from the main body portion 116. The extending portion 117 is formed to have a double cylindrical shape including the inner tubular portion having a tubular shape (in the example, cylindrical shape) which extends to the shaft second direction side X2 from the end part on the shaft second direction side X2 of the main body portion 116 and the radially outer side; an annular plate portion having an annular plate shape which extends to the radially outer side from the end part on the shaft second direction side X2 of the inner tubular portion; raid an outer tubular portion having a tubular shape (in the example, cylindrical shape) which extends to the shaft first direction side X1 from the end part on the radially outer side of the annular plate portion. On the outer circumferential surface of the input tubular portion 22 (second input tubular portion 23), a plurality of meshing teeth which are formed at a certain pitch in the circumferential direction across the entire circumference, and extend in the shaft direction X, are formed, and a part at which the meshing teeth are formed is a meshing portion 115. On the inner circumferential surface of the sleeve member 100 (main body portion 116), the plurality of meshing teeth which are formed at a certain pitch in the circumferential direction across the entire circumference, and extend in the shaft direction X, are formed, and a part at which the meshing teeth are formed is a meshing portion 114. The meshing portion 115 of the input tubular portion 22 and the meshing portion 114 of the sleeve member 100 mesh with each other, and the relative movement in the shaft direction X is allowed, but the meshing portion 115 and the meshing portion 114 rotate integrally with each other in the circumferential direction.

On the outer circumferential surface of the sleeve member 100 (the outer tubular portion of the extending portion 117), the plurality of meshing teeth which are formed at a certain pitch in the circumferential direction across the entire circumference, and extend in the shaft direction X, are formed, and a part at which the meshing teeth are formed is a first meshing portion 104. On the inner circumferential surface of the tubular second hub portion C23 fixed to the rotor supporting member 3, the plurality of meshing teeth which are formed at a certain pitch in the circumferential direction across the entire circumference, and extend in the shaft direction X, are formed, and a part at which the meshing teeth are formed is a second meshing portion 102. Similar to the first embodiment, the second hub portion C23 is configured integrally with the rotor supporting member 3, and is disposed on the radially inner side than the supporting tubular portion 31. In addition, the second hub portion C23 is formed to protrude in the shaft direction X (for example, shaft first direction side X1) from the location in the middle of the radial direction in the second radially supporting portion 32, and is configured integrally with the second radially supporting portion 32.

The second engagement device C2 includes the tubular second drum portion C24 which supports the sleeve member 100 (main body portion 116) from the radially outer side. The second drum portion C24 is configured to be integrated with the second input member 2, and rotates integrally with the second input member 2. The second drum portion C24 extends to the shaft second direction side X2 from the radially extending portion 21. On the shaft first direction side X1 of the sleeve member 100 (main body portion 116), the first oil chamber C42 is provided. The first oil chamber C42 is disposed between the sleeve member 100 (main body portion 116) and the radially extending portion 21 in the shaft direction X, that is, on the shaft first direction side X1 of the sleeve member 100 (main body portion 116), and is configured to push the sleeve member 100 to the shaft second direction side X2 which is on the engagement side by the hydraulic pressure supplied to the first oil chamber C42. The first oil chamber C42 is an annular space which is surrounded by a surface on the shaft first direction side X1 of the sleeve member 100 (main body portion 116), a surface on the shaft second direction side X2 of the radially extending portion 21, an outer circumferential surface of the input tubular portion 22 (second input tubular portion 23), and the inner circumferential surface of the second drum portion C24.

On the outer circumferential surface of the input tubular portion 22 (second input tubular portion 23), the inner circumferential surface of a cylindrical second actuator supporting member 40 is fitted on the shaft second direction side X2 than the sleeve member 100 (main body portion 116). The second actuator supporting member 40 is positioned in the shaft direction X with respect to the second input tubular portion 23 by a second snap ring 48 fitted to the outer circumferential surface of the second input tubular portion 23. The second oil chamber C41 is provided on the shaft second direction side X2 of the sleeve member 100 (main body portion 116). The second oil chamber C41 is disposed between the sleeve member 100 (main body portion 116) and the second actuator supporting member 40 in the shaft direction X, that is, on the shaft second direction side X2 of the sleeve member 100 (main body portion 116), and is configured to push the sleeve member 100 to the shaft first direction side X1 which is on the releasing side by the hydraulic pressure supplied to the second oil chamber C41. The second oil chamber C41 is an annular space which is surrounded by a surface on the shaft second direction side X2 of the sleeve member 100 (main body portion 116), a surface on the shaft first direction side X1 of the second actuator supporting member 40, an outer circumferential surface of the input tubular portion 22 (second input tubular portion 23), and the inner circumferential surface of sleeve member 100 (inner tubular portion of the extending portion 117). The ring-shaped seal member is provided on each sliding surface or the like on which the sleeve member 100 slides.

The sleeve member 100 (main body portion 116) corresponds to the second piston C26 driven b the hydraulic pressure of the first oil chamber C42 and the second oil chamber C41. The outer circumferential surface of the input tubular portion 22 (second input tubular portion 23) configures the inner sliding surface on which the inner circumferential surface of the sleeve member 100 (main body portion 116) which serves as the second piston slides.

A columnar oil chamber communication hole 103 which penetrates the sleeve member 100 (main body portion 116) in the shaft direction X, and communicates with the first oil chamber C42 and the second oil chamber C41, is provided. When the sleeve member 100 slides to the shaft first direction side X1, the end surface of the shaft first direction side X1 of the sleeve member 100 (main body portion 116) abuts against the end surface of the shaft second direction side X2 of the radially extending portion 21, and an opening on the shaft first direction side X1 of the oil chamber communication hole 103 is blocked by the end surface of the shaft second direction side X2 of the radially extending portion 21. In this state, the hydraulic pressure supplied to the second oil chamber C41 is not transmitted to the first oil chamber C42 through the oil chamber communication hole 103. In the oil path which supplies the hydraulic pressure to the first oil chamber C42, a first pressure sensor which detects the hydraulic pressure of the oil path is provided (not illustrated). When the hydraulic pressure of the oil path of the first oil chamber C42 decreases in a detection value of the first pressure sensor, the control device can indirectly detect that the sleeve member 100 moves to the shaft first direction side X1 and the second engagement device C2 is released. Meanwhile, when the sleeve member 100 slides to the shaft second direction side X2, the end surface on the shaft second direction side X2 of the sleeve member 100 (main body portion 116) abuts against the end surface on the shaft first direction side X1 of the second actuator supporting member 40, and the opening on the shaft second direction side X2 of the oil chamber communication hole 103 is blocked by the end surface of the shaft first direction side X1 of the second actuator supporting member 40. In this state, the hydraulic pressure supplied to the first oil chamber C42 is not transmitted to the second of chamber C41 through the oil chamber communication hole 103, in the oil path which supplies the hydraulic pressure to the second oil chamber C41, a second pressure sensor which detects the hydraulic pressure of the oil path is provided (not illustrated). When the hydraulic pressure of the oil path of the second oil chamber C41 decreases in a detection value of the second pressure sensor, the control device can indirectly detect that the sleeve member 100 moves to the shaft second direction side X2 and is engaged with the second engagement device C2.

The second engagement device C2 is provided with a second elastic member 101 which uses the sleeve member 100. The second elastic member 101 is disposed between the sleeve member 100 (annular plate portion of the extending portion 117) and the second drum portion C24 in the shaft direction X, and is configured to bias the sleeve member 100 to the shaft second direction side X2 which is the engagement side.

The second hydraulic pressure actuator C25 includes the first oil chamber C42 and the second oil chamber C41 which drive the sleeve member 100 (main body portion 116) which serve as the second piston. The first oil chamber C42 and the second oil chamber C41 (at least the first oil chamber C42) correspond to the second hydraulic pressure chamber C27 which drives the second piston C26 in the first embodiment. The second hydraulic pressure actuator C25 is configured of the sleeve member 100 (main body portion 116), the first oil chamber C42, the second oil chamber C41 and the second elastic member 101. Similar to the above-described first embodiment, each portion of the second hydraulic pressure actuator C25 except for the second elastic member 101 is disposed in a second accommodation space 42 which is a cylindrical space on the radially inner side that the second drum portion C24 and the radially outer side of the second input tubular portion 23.

In the embodiment, the oil chamber of the second engagement device C2 is also formed to be adjacent to the shaft second direction side X2 of the radially extending portion 21. The first oil chamber C42 of the second engagement device C2 is formed to be adjacent to the shaft second direction side X2 of the radially extending portion 21, and a surface of the shaft second direction side X2 of the radially extending portion 21 configures the surface on the shaft first direction side X1 of the first oil chamber C42.

In the embodiment, the input tubular portion 22 is also provided similar to the first embodiment, and the input tubular portion 22 supports the first oil chamber forming member which is a member that forms the oil chamber of the first engagement device C1, and the second oil chamber forming member which is a member that forms the oil chamber of the second engagement device C2. In addition, the outer circumferential surface of the input tubular portion 22 abuts against at least a part of the first oil chamber for member and at least a part of the second oil chamber forming member, and supports the first oil chamber forming member and the second oil chamber forming member from the radially inner side. The input tubular portion 22 is linked to rotate integrally with the first oil chamber forming member and the second oil her forming member. The second oil chamber forming member which forms the first oil chamber C42 that is the oil chamber of the second engagement device C2, is the sleeve member 100 (main body portion 116), the radially extending portion 21, the second drum portion C24, and the input tubular portion 22 (second input tubular portion 23). The outer circumferential surface of the input tubular portion 22 abuts against the inner circumferential surface of the sleeve member 100 (main body portion 116) which serves as the second piston C26 to be slidable, supports the sleeve member 100 from the radially inner side, and configures the inner circumferential surface of the first oil chamber C42. The input tubular portion 22 supports the radially extending portion 21 from the radially inner side. In addition, the second drum portion C24 extends to the shaft second direction side X2 from the end part on the radially outer side of the radially extending portion 21, and the input tubular portion 22 supports the second drum portion C24 from the radially inner side via the radially extending portion 21.

In addition, the second oil chamber forming member which forms the second oil chamber C41 that is the oil chamber of the second engagement device C2, is the sleeve member 100 (the main body portion 116, and the inner tubular portion of the extending portion 117), the second actuator supporting member 40, and the input tubular portion 22 (second input tubular portion 23). The outer circumferential surface of the input tubular portion 22 supports the inner circumferential surface of the sleeve member 100 (main body portion 116) to be slidable from the radially inner side, and configures the inner circumferential surface of the second oil chamber C41. The outer circumferential surface of the input tubular portion 22 supports the inner circumferential surface of the second actuator supporting member 40 from the radially inner side.

The second hydraulic pressure actuator C25 is disposed in a space on the shaft second direction side X2 than the radially extending portion 21, and on the radially inner side than the supporting tubular portion 31. In addition, the second hydraulic pressure actuator C25 is disposed to overlap with the rotor Ro when viewed in the radial direction.

The rotor supporting member 3 is provided with the first radially supporting portion 36 and the second radially supporting portion 32 similar to the first embodiment, and the first engagement device C1 and the second engagement device C2 are on the radially inner side than the supporting tubular portion 31, and are disposed between the first radially supporting portion 36 and the second radially supporting portion 32 in the shaft direction X.

Similar to the first embodiment, a part on the opposite side (shaft second direction side X2) of the connection oil path forming member 55 from the side on which the radially linking portion 94 is disposed, is supported to be rotatable with respect to the case CS via the rotor supporting member 3.

In the embodiment, in the input tubular portion 22 and the case boss portion 52, the oil path which supplies the oil to the oil chamber of the second engagement device C2 is formed. In the input tubular portion 22 (second input tubular portion 23), a second supply oil path C44 which supplies the oil to the first oil chamber C42 of the second engagement device C2, and a third supply oil path C43 which supplies the oil to the second oil chamber C41 of the second engagement device C2, are formed. In the case boss portion 52, a second inner oil path (not illustrated) which supplies the oil to the first oil chamber C42 of the second engagement device C2, and a third inner oil path (not illustrated) which supplies the oil to the second oil chamber C41 to the second engagement device C2 are formed.

In the embodiment, between the case boss portion 52 and the input tubular portion 22, the tubular (in the example, cylindrical shape) connection oil path forming member 55 which forms the oil path that connects the oil path formed in the case boss portion 52 and the oil path formed in the input tubular portion 22 to each other, is provided. In the connection oil path forming member 55, the penetrating oil path 91 and a first inner circumferential oil path 111 which connect the first supply oil path C18 of the input tubular portion 22 and the first inner oil path 54 of the case boss portion 52 to each other, are formed. In the connection oil path forming member 55, a penetrating oil path 106 and a second inner circumferential oil path 112 which connect the second supply oil path C44 of the input tubular portion 22 and the second inner of path of the case boss portion 52 to each other, are formed. In the connection oil path forming member 55, a penetrating oil path 105 and a third inner circumferential oil path 113 which connect the third supply oil path C43 of the input tubular portion 22 and the third inner oil path of the case boss portion 52 to each other, are formed.

In the embodiment, the inner circumferential surface of the connection oil path forming member 55 is also fitted and fixed to the outer circumferential surface of the case boss portion 52. The inner circumferential surface of the input tubular portion 22 is supported to be rotatable with respect to the outer circumferential surface of the case boss portion 52 via the connection oil path forming member 55. At a part on the shaft first direction side X1 on the outer circumferential surface of the connection oil path forming member 55, the first groove which extends in the circumferential direction and is recessed to the radially inner side is formed, and a space which is surrounded by the first groove and the inner circumferential surface of the input tubular portion 22 (second input tubular portion 2), is the first inner circumferential oil path 111. At the center part in the shaft direction X on the outer circumferential surface of the connection oil path forming member 55, a second groove which extends in the circumferential direction and is recessed to the radially inner side is formed, and a space which is surrounded by the second groove and the inner circumferential surface of the input tubular portion 22 (second input tubular portion 23), is the second inner circumferential oil path 112. At a part on the shaft second direction side X2 on the outer circumferential surface of the connection oil path forming member 55, a third groove which extends in the circumferential direction and is recessed to the radially inner side is formed, and a space which is surrounded by the third groove and the inner circumferential surface of the input tubular portion 22 (second input tubular portion 23), is the third inner circumferential oil path 113.

On the shaft first direction side X1 of the first groove in the shaft direction X, a first tubular portion 107 having a tubular shape which protrudes to the radially outer side with respect to the first groove, and is included in the connection oil path forming member 55, is disposed. Between the first groove and the second groove in the shaft direction X, a second tubular portion 108 having a tubular shape which protrudes to the radially outer side with respect to the first groove and the second groove, and is included in the connection oil path forming member 55, is disposed. Between the second groove and the third groove in the shaft direction X, a third tubular portion 109 having a tubular shape which protrudes to the radially outer side with respect to the second groove and the third groove, and is included in the connection oil path forming member 55, is disposed. On the shaft second direction side X2 of the third groove in the shaft direction X, a fourth tubular portion 110 having a tubular shape which protrudes to the radially outer side with respect to the third groove, and is included in the connection oil path forming member 55, is disposed. In each of the first tubular portion 107, the second tubular portion 108, the third tubular portion 109, and the fourth tubular portion 110, the tubular seal member which seals a part between the inner circumferential surfaces of the input tubular portion 22, is provided.

In the embodiment, the second partition wall 61 and the case boss portion 52 of the case CS is provided with a plurality of oil paths for supplying the hydraulic pressure supplied from the hydraulic pressure control device (not illustrated) to each portion of the hybrid driving device 10, such as the first hydraulic pressure chamber C17, the first back pressure chamber C19, the first oil chamber C42, the second oil chamber C41, the friction plate of the first engagement device C1, the first meshing portion 104 and the second meshing portion 102 of the second engagement device C2, each hearing, and rotary electric machine MG. In the case boss portion 52, at a plurality of positions different from each other in the circumferential direction, the first inner oil path 54 which supplies the hydraulic pressure to the first hydraulic pressure chamber C17, the second inner of path which supplies the hydraulic pressure to the first oil chamber C42, the third inner oil path which supplies the hydraulic pressure to the second oil chamber C41, and the inner lubricating oil path which supplies the hydraulic pressure to the first back pressure chamber C19, the first meshing portion 104 and the second meshing portion 102 of the second engagement device C2, the friction plate of the first engagement device C1, the bearing, and the rotary electric machine MG, are formed.

The first inner oil path 54 extends to the radially outer side from the oil path that extends in the shaft direction X, is open to the outer circumferential surface of the case boss portion 52, and communicates with the first inner circumferential oil path 111 via the penetrating oil path 91 which penetrates the connection oil path forming member 55 in the radial direction. The second inner oil path extends to the radially outer side from the oil path that extends in the shaft direction X, is open to the outer circumferential surface of the case boss portion 52, and communicates with the second inner circumferential oil path 112 via the penetrating oil path 106 which penetrates the connection oil path forming member 55 in the radial direction. The third inner oil path extends to the radially outer side from the oil path that extends in the shaft direction X, is open to the outer circumferential surface of the case boss portion 52, and communicates with the third inner circumferential oil path 113 via the penetrating oil path 105 which penetrates the connection oil path forming member 55 in the radial direction. The hydraulic pressure supplied to the second lubricating supply void 84 from the inner lubricating oil path is supplied to the first meshing portion 104 and the second meshing portion 102 of the second engagement device C2, the bearings 71 and 73, or the rotary electric machine MG, through the through hole 87 or the like which penetrates the second input tubular portion 23 in the radial direction.

Other Embodiments

Finally, other embodiments of the hybrid driving device 10 will be described. In addition, the configuration of each embodiment which will be described hereinafter is not limited to independent application of each embodiment, and it is also possible to employ the embodiments by combining the configurations with other embodiments as long as there is no contradiction.

(1) In the above-described embodiments, a case where the second input member 2 and the transmission apparatus TM are directly linked to each other, is described as an example. However, the embodiment of the hybrid driving device 10 is not limited thereto. In other words, between the second input member 2 and the transmission apparatus TM, other power transmission mechanisms, such as a torque converter, a clutch, or a gear mechanism, may be interposed.

(2) In the above-described embodiments, a case where the internal combustion engine EN and the first input member 1 are directly linked to each other, is described as an example. However, the embodiment of the hybrid driving device 10 is not limited thereto. In other words, between the internal combustion engine EN and the first input member 1, other power transmission mechanisms, such as a torque converter or a gear mechanism, may be interposed.

(3) In the above-described embodiments, a case where the transmission apparatus TM is a stepped automatic transmission apparatus, is described as an example. However, the embodiment of the hybrid driving device 10 is not limited thereto. In other words, when the transmission apparatus TM changes the speed of the rotation of the second input member 2, and transmits the rotation to the output member O, any type of transmission apparatus M may be employed, and for example, a continuously variable automatic transmission apparatus which continuously changes the transmission shift ratio may be employed.

(4) In the above-described embodiments, a case where one rotary electric machine MG is provided, is described as an example. However, the embodiment of the hybrid driving device 10 is not limited thereto. In other words, a second rotary electric machine may be provided. For example, the second rotary electric machine may be linked to the output member O of the transmission apparatus TM, the planetary gear mechanism may be provided between the internal combustion engine EN and the first input member 1, and the second rotary electric machine may be linked to the planetary gear mechanism.

(5) in the above-described first embodiment, a case where the second hydraulic pressure chamber C27 is disposed on the shaft second direction side X2 of the second piston C26, the second elastic member 44 is disposed on the shaft first direction side X1 of the second piston C26, the first hydraulic pressure chamber C17 is disposed on the shaft second direction side X2 of the first piston C16, and the first elastic member 45 is disposed on the shaft first direction side X1 of the first piston C16, is described as an example. However, the embodiment of the hybrid driving device 10 is not limited thereto. In other words, the second hydraulic pressure chamber C27 may be disposed on the shaft first direction side X1 of the second piston C26, the second elastic member 44 may be disposed on the shaft second direction side X2 of the second piston C26, the first hydraulic pressure chamber C17 may be disposed on the shaft first direction side X1 of the first piston C16, and the first elastic member 45 may be disposed on the shaft second direction side X2 of the first piston C16.

(6) In the above-described second embodiment, a case where the first oil chamber C42, the second oil chamber C41, the second elastic member 101 are configured to drive the sleeve member 100 (Main body portion 116), is described as an example. However, the embodiment of the present disclosure is not limited thereto. In other words, without providing the first oil chamber C42, the second oil chamber C41 and the second elastic member 101 fray be configured to drive the sleeve member 100 (main body portion 116), and without providing the second elastic member 101, the first oil chamber C42 and the second oil chamber C41 may be configured to drive the sleeve member 100 (main body portion 116).

3. Summary of Embodiments

Hereinafter, a summary of the hybrid driving device (10) described above will be briefly described.

The hybrid driving device (10) including the first input member (1) which is linked to the internal combustion engine (EN); the rotary electric machine (MG); the transmission apparatus (TM) which changes the speed of the rotation of the second input member (2), and transmits the rotation to the output member (O); the rotor supporting member (3) which rotates integrally with the rotor (Ro) of the rotary electric machine (MG); the first engagement device (C1); the second engagement device (C2); and the case (CS), is configured as follows as one aspect. The first engagement device (C1) links or separates the first input member (1) and the second input member (2) to and from each other in accordance with a state of engagement of the first engagement device (C1) regardless of a state of engagement of the second engagement device (C2), the second engagement device (C2) links or separates the rotor supporting member (3) and the second input member (2) to and from each other in accordance with a state of engagement of the second engagement device (C2) regardless of a state of engagement of the first engagement device (C1), the rotor supporting member (3) includes a supporting tubular portion (31) having a tubular shape which supports the inner circumferential surface of the rotor (Ro) of the rotary electric machine (MG) from the radially inner side, the first engagement device (C1) and the second engagement device (C2) are disposed on the radially inner side than the supporting tubular portion (31), the case (CS) has the tubular case boss portion (52), the second input member (2) includes the input tubular portion (22) having a tubular shape which is disposed on the radially outer side of the case boss portion (52), both of the first engagement device (C1) and the second engagement device (C2) are engagement devices which are operated by an hydraulic pressure, and which are respectively provided with the oil chamber, and the tubular input portion (22) supports the first oil chamber forming member which is a member that forms the oil chamber of the first engagement device (C1), and the second oil chamber forming member which is a member that forms the oil chamber of the second engagement device (C2).

According to the configuration, by efficiently using the space on the radially inner side than the rotor (Ro) and the supporting tubular portion (31), it is possible to dispose the first engagement device (C1) and the second engagement device (C2), and to prevent the device from becoming long in the shaft direction. It is possible to support the input tubular portion (22) having a tubular shape which configures the second input member (2) from the radially inner side by the tubular case boss portion (52). In addition, it is possible to support the first oil chamber forming member of the first engagement device (C1) and the second oil chamber forming member of the second engagement device (C2) by the common input tubular portion (22). Accordingly, it is possible to support the first oil chamber forming member and the second oil chamber forming member by efficiently using the space on the radially inner side of the rotor (Ro) and the supporting tubular portion (31), and from this viewpoint, it is possible to prevent the device from becoming long in the shaft direction. In addition, it is possible to simplify a supporting structure of the first oil chamber forming member and the second oil chamber forming member, and to contribute to reduction of the size of the device.

In addition, it is appropriate that the outer circumferential surface of the input tubular portion (22) abuts against at least a part of the first oil chamber forming member and at least a part of the second oil chamber forming member, and supports the first oil chamber forming member and the second oil chamber forming member from the radially inner side, and the input tubular portion (22) is linked to rotate integrally with the first oil chamber forming member and the second oil chamber forming member.

According to the configuration, by the outer circumferential surface of the input tubular portion (22), it is possible to support the first oil chamber forming member and the second chamber forming member from the radially inner side, and to integrally rotate the first oil chamber forming member and the second oil chamber forming member by the input tubular portion (22). Accordingly, it is possible to appropriately support the first oil chamber forming member and the second oil chamber forming member of the first engagement device (C1) and the second engagement device (C2) which are disposed on the radially inner side of the rotor (Ro) and the supporting tubular portion (31), by the input tubular portion (22).

In addition, it is appropriate that the first oil chamber forming member includes at least the first piston (C6), the second oil chamber forming member includes at least the second piston (C26), and the outer circumferential surface of the input tubular portion abuts against the inner circumferential surface of the first piston (C16) and the inner circumferential surface of the second piston (C26) to be slidable, and supports the first piston (C16) and the second piston (C26) from the radially inner side, and configures the inner circumferential surface of the oil chamber of the first engagement device (C1) and the inner circumferential surface of the oil chamber of the second engagement device (C2).

According to the configuration, while allowing the outer circumferential surface of the input tubular portion (22) to efficiently function as the sliding surface on which the inner circumferential surface of the first piston (C16) and the second piston (C26) slides, and the inner circumferential surface of the oil chamber of the first engagement device (C1) and the second engagement device (C2), by the outer circumferential surface of the input tubular portion (22), it is possible to support the first piston (C16) and the second piston (C26) from the radially inner side.

In addition, it is appropriate that the second input member (2) has the radially extending portion (21) which extends to the radially outer side from the input tubular portion (22), considering one side in the shaft direction (X) of the input tubular portion (22) as the shaft first direction side (X1), and the other side as the shaft second direction side (X2), the oil chamber of the first engagement device (C1) is formed to be adjacent to the shaft first direction side (X1) of the radially extending portion (21), and the oil chamber of the second engagement device (C2) is formed to be adjacent to the shaft second direction side (X2) of the radially extending portion (21).

According to the configuration, by efficiently using the space on both sides in the shaft direction of the radially extending portion (21), it is possible to dispose the oil chamber of the first engagement device (C1) and the oil chamber of the second engagement device (C2). In addition, it is possible to consider the radially extending portion (21) as a common wall which divides the oil chamber of the first engagement device (C1) and the oil chamber of the second engagement device (C2). Accordingly, it is possible to dispose the oil chamber of the first engagement device (C1) and the oil chamber of the second engagement device (C2) by efficiently using the space on the radially inner side of the rotor (Ro) and the supporting tubular portion (31) in the shaft direction, and to prevent the device from becoming long in the shaft direction.

In addition, it is appropriate that the oil path which supplies the oil to the oil chamber of the first engagement device (C1), and the oil path which supplies the oil to the oil chamber of the second engagement device (C2), are formed in the input tubular portion (22) and the case boss portion (52).

According to the configuration, the supply oil path to the oil chamber of the first engagement device (C1), and the supply oil path to the oil chamber of the second engagement device (C2) are formed in the same input tubular portion (22) and the case boss portion (52). Accordingly, it is possible to form the supply oil path to the oil chamber of the first engagement device (C1) and the supply oil path to the oil chamber of the second engagement device (C2) by efficiently using the space on the radially inner side of the rotor (Ro) and the supporting tubular portion (31), and to prevent the device from becoming long in the shaft direction. In addition, it is possible to simplify the structure of the supply oil path to the oil chamber of the first engagement device (C1) and the supply oil path to the oil chamber to the second engagement device (C2), and to contribute to reduction of the size of the device.

In addition, it is appropriate that the rotor supporting member (3) includes the first radially supporting portion (36) which supports the supporting tubular portion (31) from the radially inner side and extends in the radial direction, and the second radially supporting portion (32) which is disposed at a position in the shaft direction (X) different from the first radially supporting portion (36), supports the supporting tubular portion (31) from the radially inner side, and extends in the radial direction, and the first engagement device (C1) and the second engagement device (C2) are disposed on the radially inner side than the supporting tubular portion (31) and between the first radially supporting portion (36) and the second radially supporting portion the shaft direction (X).

According to the configuration, it is possible to dispose the first engagement device (C1) and the second engagement device (C2) in a cylindrical space on the radially inner side than the supporting tubular portion (31) and interposed between the first radially supporting portion (36) and the second radially supporting portion (32), and to prevent the device from becoming long in the shaft direction. In addition, it is possible to cover both sides in the shaft direction of the first engagement device (C1) and the second engagement device (C2) with the first radially supporting portion (36) and the second radially supporting portion (32), and to be separated from the outside. Accordingly, it is easy to oil tightly manufacture the first engagement device (C1) and the second engagement device (C2).

In addition, it is appropriate that the tubular connection oil path forming member (55) which forms the oil path that connects the oil path formed in the case boss portion (52) and the oil path formed in the input tubular portion (22) to each other, is provided between the case boss portion (52) and the input tubular portion (22), the second input member (2) includes the inner tubular portion (63) having a tubular shape which is disposed on radially inner side of the case boss portion (52), and which is supported to be rotatable with respect to the inner circumferential surface of the case boss portion (52), the input tubular portion (22) and the inner tubular portion (63) are linked to each other in the radial direction to be integrally rotated, by the radially linking portion 94 provided at a position that does not overlap with the case boss portion (52) in the radial direction, and in the input tubular portion (22), a part on an opposite side of the connection oil path forming member (55) from a side on which the radially linking portion 94 is disposed, is supported to be rotatable with respect to the case (CS) via the rotor supporting member (3).

According to the configuration, by the connection oil path forming member (55), it is possible to excellently connect the oil path formed in the case boss portion (52) and the oil path formed in the input tubular portion (22). The inner tubular portion (63) having a tubular shape is supported from the radially outer side by the tubular case boss portion (52). In addition, it is also possible to support the input tubular portion (22) by the inner tubular portion (63) linked by the radially linking portion 94. In addition, it is possible to support the part on the opposite side of the connection oil path forming member (55) from the side on which the radially linking portion 94 is disposed, to be rotatable with respect to the case (CS) via the rotor supporting member (3). Accordingly, it is possible to support the input tubular portion (22) on both sides in the shaft direction of the connection oil path forming member (55), and to stably support the input tubular portion (22). Accordingly, it is also possible to stabilize the support of the first oil chamber forming member, the second oil chamber forming member or the like, which is supported by the input tubular portion (22), and to perform the operation of the first engagement device (C1) and the second engagement device (C2) with high reliability.

In addition, it is appropriate that the second engagement device (C2) includes the tubular sleeve member (100) which slides in the shaft direction (X) along the outer circumferential surface of the input tubular portion (22), and rotates integrally with the outer circumferential surface of the input tubular portion (22) in the circumferential direction, the first meshing portion (104) which is fixed to the sleeve member (100), the second meshing portion (102) which is fixed to the rotor supporting member (3), and meshes with the first meshing portion (104), and the first oil chamber (C42) and the second oil chamber (C41) which are respectively provided on both sides in the shaft direction (X) with respect to the sleeve member (100), and any of the sleeve member (100), the first oil chamber (C42), and the second oil chamber (C41) is provided to overlap with the rotor (Ro) and the input tubular portion (22) when viewed in the radial direction.

According to the configuration even when the second engagement device (C2) is the meshing type engagement device which is operated by the hydraulic pressure, by efficiently using the space on the radially inner side than the rotor (Ro) and the input tubular portion (22), it is possible to dispose the first engagement device (C1) and the second engagement device (C2), and to prevent the device from becoming long in the shaft direction. In a case of the friction engagement device, there is a concern that dragging torque is transmitted by the relative rotation of the friction plates. In the meshing, type engagement device, compared to the friction engagement device, the transmission of the dragging torque is small, and it is possible to reduce torque loss in a case where the second engagement device (C2) is released and the rotary electric machine (MG) is separated from the second input member.

In addition, it is appropriate that the second engagement device (C2) is configured to allow the primary engagement member (C21) which rotates integrally with the rotor supporting member (3), and the secondary engagement member (C22) which rotates integrally with the second input member (2), to be engaged with each other, the second engagement device (C2) further includes the tubular second hub portion (C23) which supports the primary engagement member (C21) from the radially inner side, and the tubular second drum portion (C24) which supports the secondary engagement portion (C22) from the radially outer side, the second hub portion (C23) is configured integrally with the rotor supporting member (3), and is disposed on the radially inner side than the supporting tubular portion (31), the second drum portion (C24) is disposed between the supporting tubular portion (31) and the second hub portion (C23) in the radial direction, and the supporting tubular portion (31), the second hub portion (C24), and the second hub portion (C23) are disposed to overlap with each other when viewed in the radial direction.

According to the configuration, between the supporting tubular portion (31) of the rotor supporting member (3) and the second hub portion (C23) configured integrally with the rotor supporting member (3), the second drum portion (C24) which rotates integrally with the second input member (2) is disposed. Accordingly, the primary engagement member (C21) and the secondary engagement member (C22) are disposed in a space which is the radially inner side of the second drum portion (C24) and the radially outer side of the second hub portion (C23). Accordingly, it is possible to dispose each portion of the second engagement device (C2) by efficiently using the space on the radially inner side of the rotor (Ro) and the supporting tubular portion (31), and from this viewpoint, it is possible to prevent the device from becoming long in the shaft direction (X).

In addition, since the second hub portion (C23) is configured integrally with the rotor supporting member (3), it is possible to simplify the attaching structure of the second hub portion (C23), and to contribute to reduction of the size of the device.

In addition, it is appropriate that the first engagement device (C1) is configured to allow the primary engagement member (C11) which rotates integrally with the first input member (1), and the secondary engagement member (C12) which rotates integrally with the second input member (2), to be engaged with each other, the first engagement device (C1) further includes the tubular first hub portion (C13) which supports the primary engagement member (C11) of the first engagement device (C1) from the radially inner side, and the tubular first drum portion (C14) which supports the secondary engagement portion (C12) of the first engagement device (C1) from the radially outer side, the second input portion (2) includes the radially extending portion (21) which extends in the radial direction, the first drum portion (C14) is formed to extend to the shaft first direction side (X1) which is one side in the shaft direction (X) from the radially extending portion (21), and the first hydraulic pressure actuator (C15) of the first engagement device (C1) is disposed on the shaft first direction side (X1) than the radially extending portion (21) and on the radially inner side than the first drum portion (C14) to overlap with the first drum portion (C14) when viewed in the radial direction, and the second drum portion (C24) is formed to extend to the shaft second direction side (X2) which is opposite to the shaft first direction side (X1) from the radially extending portion (21), and the second hydraulic pressure actuator (C25) of the second engagement device (C2) is disposed on the shaft second direction side (X2) than the radially extending portion (21) and on the radially inner side than the second drum portion (C24) to overlap with the second drum portion (C24) when viewed in the radial direction.

According to the configuration, it is possible to form the first drum portion (C14) and the second drum portion (C24) by allowing the first drum portion (C14) and the second drum portion (C24) to extend to both sides of the shaft direction (X) from the common radially extending portion (21) that configures the second input member (2). Accordingly, it is possible to simplify the supporting mechanism of the first and second drum portions (C14, C24), and to dispose the first and second drum portions (C14, C24) by efficiently using the space on both sides in the shaft direction (X) of the radially extending portion (21). In addition, it is possible to dispose the first and second hydraulic pressure actuators (C15, C25) by efficiently using the space which is the radially inner side of the first and second drum portions (C14, C24) and both sides in the shaft direction (X) of die radially extending portion 21. Accordingly, on both sides in the shaft direction (X) of the radially extending portion (21), it is possible to efficiently dispose the first and second engagement devices (C1, C2), and to prevent the device from becoming long in the shaft direction (X).

In addition, it is appropriate that both of the hydraulic pressure actuator (C15) of the first engagement device (C1) and the hydraulic pressure actuator (C25) of the second engagement device (C2), are disposed to overlap with the rotor (Ro) when viewed in the radial direction.

According to the configuration, by efficiently using the space on the radially inner side of the rotor (Ro), it is possible to dispose the hydraulic pressure actuators (C15, C25) of the first and second engagement devices (C1, C2), and to prevent the device from becoming long in the shaft direction (X).

In addition, it is appropriate that the first engagement device (C1) is provided with the annular first piston (C16), and the first hydraulic pressure actuator (C15) including the first hydraulic pressure chamber (C17) which drives the first piston (C16), and the second engagement device (C2) is provided with the annular second piston (C26), and the second hydraulic pressure actuator (C25) including the second hydraulic pressure chamber (C27) which drives the second piston the second input member (2) includes the input tubular portion (22) having a tubular shape which extends in the shaft direction (X) on the radially inner side than the first piston (C16) and the second piston (C26), the outer circumferential surface of the input tubular portion (22) configures the inner sliding surface on which the inner circumferential surface of the first piston (C16) and the inner circumferential surface of the second piston (S26) slide, and the input tubular portion (22) is provided with the first supply oil path (C18) which penetrates in the radial direction and supplies the hydraulic pressure to the first hydraulic pressure chamber (C17), and the second supply oil path (C28) which penetrates in the radial direction and supplies the hydraulic pressure to the second hydraulic pressure chamber (C27).

According to the configuration, it is possible to support both of the first piston (C16) of the first engagement device (C1) and the second piston (C26) of the second engagement device (C2) from the radially inner side by the same input tubular portion (22) which configures the second input member (2). In addition, it is possible to provide each of the first supply oil path (C18) which supplies the hydraulic pressure to the first hydraulic pressure chamber (C17) of the first engagement device (C1), and the second supply oil path (C28) which supplies the hydraulic pressure to the second hydraulic pressure chamber (C27) of the second engagement device (C2), so as to penetrate the same input tubular portion (22) having a tubular shape in the radial direction. Accordingly, it is possible to provide the oil path which supplies the hydraulic pressure to the first and second hydraulic pressure chambers (C17, C27) on the radially inner side of the input tabular portion (22), to generalize and simplify the oil supply path of the hydraulic pressure, to prevent the device from becoming long in the shaft direction X, and to achieve the small size of the device.

In addition, it is appropriate that the rotor supporting member (3) further includes the shaft supporting portion (70) which is disposed on the radially inner side than the supporting tubular portion (31) and supported to be rotatable by the bearing (71), and the radially supporting portion (32) which extends in the radial direction to link the shaft supporting portion (70) and the supporting tubular portion (31) to each other, and the second hub portion (C23) is formed to protrude in the shaft direction (X) from a location in the middle of the radial direction in the radially supporting portion (32), and is configured integrally with the radially supporting portion (32).

According to the configuration, without providing the dedicated supporting member which extends in the radial direction for disposing the second hub portion (C23) on the radially inner side of the supporting tubular portion (31), it is possible to dispose the second hub portion (C23) in the axial direction by using the radially supporting portion (32) which extends in the radial direction for linking the supporting tubular portion (31) and the shaft supporting portion (70) to each other. In addition, the second hub portion (C23) is configured integrally with the radially supporting portion (32), and is it not necessary to provide a fastening member which attaches the second hub portion (C23) to the radially supporting portion (32). Accordingly, by providing the dedicated supporting member which extends in the radial direction, or by providing the fastening member, it is possible to prevent the device from becoming long in the shaft direction X.

The invention claimed is:

1. A hybrid driving device comprising:

a first input that is linked to an internal combustion engine;

a rotary electric machine;

a transmission that changes a speed of rotation of a second input, and transmits the rotation to an output;

a rotor support which rotates integrally with a rotor of the rotary electric machine;

a first engagement device;

a second engagement device; and a case, wherein:

the first engagement device links or separates the first input and the second input to and from each other in accordance with a state of engagement of the first engagement device regardless of a state of engagement of the second engagement device, the second engagement device links or separates the rotor support and the second input to and from each other in accordance with a state of engagement of the second engagement device regardless of a state of engagement of the first engagement device, the rotor support includes a supporting tubular portion having a tubular shape that supports an inner circumferential surface of the rotor of the rotary electric machine from a radially inner side, and the first engagement device and the second engagement device are disposed on the radially inner side relative to the supporting tubular portion, the case has a tubular case boss portion, the second input includes an input tubular portion having a tubular shape that is disposed on a radially outer side of the case boss portion, both of the first engagement device and the second engagement device are engagement devices which are operated by a hydraulic pressure, and which are respectively provided with an oil chamber, and the input tubular portion supports a first oil chamber forming member which is a member that forms the oil chamber of the first engagement device, and a second oil chamber forming member which is a member that forms the oil chamber of the second engagement device.

2. The hybrid driving device according to claim 1, wherein:

an outer circumferential surface of the input tubular portion abuts against at least a part of the first oil chamber forming member and at least a part of the second oil chamber forming member, and supports the first oil chamber forming member and the second oil chamber forming member from the radially inner side, and the input tubular portion is linked to rotate integrally with the first oil chamber forming member and the second oil chamber forming member.

3. The hybrid driving device according to claim 1, wherein the first oil chamber forming member includes at least a first piston, the second oil chamber forming member includes at least a second piston, and an outer circumferential surface of the input tubular portion abuts against an inner circumferential surface of the first piston and an inner circumferential surface of the second piston to be slidable, and supports the first piston and the second piston from the radially inner side, and configures an inner circumferential surface of the oil chamber of the first engagement device and an inner circumferential surface of the oil chamber of the second engagement device.

4. The hybrid driving device according to claim 2, wherein the first oil chamber forming member includes at least a first piston, the second oil chamber forming member includes at least a second piston, and the outer circumferential surface of the input tubular portion abuts against an inner circumferential surface of the first piston and an inner circumferential surface of the second piston to be slidable, and supports the first piston and the second piston from the radially inner side, and configures an inner circumferential surface of the oil chamber of the first engagement device and an inner circumferential surface of the oil chamber of the second engagement device.

5. The hybrid driving device according to claim 1, wherein:

the second input has a radially extending portion which extends to a radially outer side from the input tubular portion, one side in the shaft direction of the input tubular portion is a shaft first direction side, and the other side in the shaft direction of the input tubular portion is a shaft second direction side, the oil chamber of the first engagement device is formed to be adjacent to the shaft first direction side of the radially extending portion, and the oil chamber of the second engagement device is formed to be adjacent to the shaft second direction side of the radially extending portion.

6. The hybrid driving device according to claim 1, wherein an oil path which supplies oil to the oil chamber of the first engagement device, and an oil path which supplies oil to the oil chamber of the second engagement device, are formed in the input tubular portion and the case boss portion.

7. The hybrid driving device according to claim 1, wherein:

the rotor support includes a first radially supporting portion which supports the supporting tubular portion from the radially inner side and extends in a radial direction, and a second radially supporting portion which is disposed at a position in the shaft direction different from the first radially supporting portion, supports the supporting tubular portion from the radially inner side, and extends in the radial direction, and the first engagement device and the second engagement device are further inwards in the radial direction than the supporting tubular portion, and are disposed between the first radially supporting portion and the second radially supporting portion in the shaft direction.

8. The hybrid driving device according to claim 1, wherein:

a tubular connection oil path forming member which forms an oil path that connects an oil path formed in the case boss portion and an oil path formed in the input tubular portion to each other, is provided between the case boss portion and the input tubular portion, the second input includes a tubular inner side portion having a tubular shape which is disposed on the radially inner side of the case boss portion, and which is supported to be rotatable with respect to the inner circumferential surface of the case boss portion, the input tubular portion and the inner tubular portion are linked to each other in a radial direction to be integrally rotated, by a radially linking portion provided at a position that does not overlap with the case boss portion in the radial direction, and in the input tubular portion, a part on an opposite side of the connection oil path forming member from a side on which the radially linking portion is disposed, is supported to be rotatable with respect to the case via the rotor support.

9. The hybrid driving device according to claim 6, wherein:

a tubular connection oil path forming member which forms an oil path that connects an oil path formed in the case boss portion and an oil path formed in the input tubular portion to each other, is provided between the case boss portion and the input tubular portion, the second input includes a tubular inner side portion having a tubular shape which is disposed on the radially inner side of the case boss portion, and which is supported to be rotatable with respect to the inner circumferential surface of the case boss portion, the input tubular portion and the inner tubular portion are linked to each other in a radial direction to be integrally rotated, by a radially linking portion provided at a position that does not overlap with the case boss portion in the radial direction, and in the input tubular portion, a part on an opposite side of the connection oil path forming member from a side on which the radially linking portion is disposed, is supported to be rotatable with respect to the case via the rotor support.

10. The hybrid driving device according to claim 1, wherein:

the second engagement device includes a tubular sleeve member which slides in the shaft direction along an outer circumferential surface of the input tubular portion, and rotates integrally with the outer circumferential surface of the input tubular portion in the circumferential direction, a first meshing portion which is fixed to the sleeve member, a second meshing portion which is fixed to the rotor support, and meshes with the first meshing portion, and a first oil chamber and a second oil chamber which are respectively provided on both sides in the shaft direction with respect to the sleeve member, and any of the sleeve member, the first oil chamber, and the second oil chamber is provided to overlap with the rotor and the input tubular portion when viewed in a radial direction.

11. The hybrid driving device according to claim 7, wherein:

the second engagement device includes a tubular sleeve member which slides in the shaft direction along an outer circumferential surface of the input tubular portion, and rotates integrally with the outer circumferential surface of the input tubular portion in the circumferential direction, a first meshing portion which is fixed to the sleeve member, a second meshing portion which is fixed to the rotor support, and meshes with the first meshing portion, and a first oil chamber and a second oil chamber which are respectively provided on both sides in the shaft direction with respect to the sleeve member, and any of the sleeve member, the first oil chamber, and the second oil chamber is provided to overlap with the rotor and the input tubular portion when viewed in the radial direction.

12. The hybrid driving device according to claim 1, wherein:

the second engagement device is configured to allow a primary engagement member which rotates integrally with the rotor support, and a secondary engagement member which rotates integrally with the second input, to be engaged with each other, the second engagement device further includes a tubular second hub portion which supports the primary engagement member from the radially inner side, and a tubular second drum portion which supports the secondary engagement portion from the radially outer side, the second hub portion is configured integrally with the rotor support, and is disposed on the radially inner side relative to the supporting tubular portion, the second drum portion is disposed between the supporting tubular portion and the second hub portion in a radial direction, and the supporting tubular portion, the second hub portion, and the second drum portion are disposed to overlap with each other when viewed in the radial direction.

13. The hybrid driving device according to claim 7, wherein:

the second engagement device is configured to allow a primary engagement member which rotates integrally with the rotor support, and a secondary engagement member which rotates integrally with the second input, to be engaged with each other, the second engagement device further includes a tubular second hub portion which supports the primary engagement member from the radially inner side, and a tubular second drum portion which supports the secondary engagement portion from the radially outer side, the second hub portion is configured integrally with the rotor support, and is disposed on the radially inner side relative to the supporting tubular portion, the second drum portion is disposed between the supporting tubular portion and the second hub portion in the radial direction, and the supporting tubular portion, the second hub portion, and the second drum portion are disposed to overlap with each other when viewed in the radial direction.

14. The hybrid driving device according to claim 12, wherein:

the first engagement device is configured to allow a primary engagement member which rotates integrally with the first input, and a secondary engagement member which rotates integrally with the second input, to be engaged with each other, the first engagement device further includes a tubular first hub portion which supports the primary engagement member of the first engagement device from the radially inner side, and a tubular first drum portion which supports the secondary engagement portion of the first engagement device from the radially outer side, the second input includes a radially extending portion which extends in the radial direction, the first drum portion is formed to extend to the first shaft direction side which is one side in the shaft direction from the radially extending portion, and a first hydraulic pressure actuator of the first engagement device is further toward the shaft first direction side than the radially extending portion, is further inwards in the radial direction than the first drum portion, and is disposed to overlap with the first drum portion when viewed in the radial direction, and the second drum portion is formed to extend to a shaft second direction side which is opposite to the shaft first direction side from the radially extending portion, and a second hydraulic pressure actuator of the second engagement device is further toward the shaft second direction side than the radially extending portion, is further inwards in the radial direction than the second drum portion, and is disposed to overlap with the second drum portion when viewed in the radial direction.

15. The hybrid driving device according to claim 12, wherein both of a second hydraulic pressure actuator of the second engagement device and a first hydraulic pressure actuator of the first engagement device, are disposed to overlap with the rotor when viewed in the radial direction.

16. The hybrid driving device according to claim 12, wherein:

the first engagement device is provided with an annular first piston, and a first hydraulic pressure actuator including a first hydraulic pressure chamber which drives the first piston, and the second engagement device is provided with an annular second piston, and a second hydraulic pressure actuator including a second hydraulic pressure chamber which drives the second piston, the input tubular portion extends in the shaft direction on the radially inner side relative to the first piston and the second piston, an outer circumferential surface of the input tubular portion configures an inner sliding surface on which an inner circumferential surface of the first piston and an inner circumferential surface of the second piston slide, and the input tubular portion is provided with a first supply oil path which penetrates in the radial direction and supplies the hydraulic pressure to the first hydraulic pressure chamber, and a second supply oil path which penetrates in the radial direction and supplies the hydraulic pressure to the second hydraulic pressure chamber.

17. The hybrid driving device according to claim 12, wherein:

the rotor support further includes a shaft support portion which is supported to be rotatable by a bearing disposed on the radially inner side relative to the supporting tubular portion, and a radially supporting portion which extends in the radial direction to link the shaft supporting portion and the supporting tubular portion to each other, and the second hub portion is formed to protrude in the shaft direction from a location in the middle in the radial direction in the radially supporting portion, and is configured integrally with the radially supporting portion.

* * * * *